US006563796B1

(12) United States Patent
Saito

(10) Patent No.: US 6,563,796 B1
(45) Date of Patent: May 13, 2003

(54) APPARATUS FOR QUALITY OF SERVICE EVALUATION AND TRAFFIC MEASUREMENT

(75) Inventor: Hiroshi Saito, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/267,768

(22) Filed: Mar. 15, 1999

(30) Foreign Application Priority Data

Mar. 18, 1998 (JP) .......................................... 10-068772
Sep. 18, 1998 (JP) .......................................... 10-264769
Sep. 21, 1998 (JP) .......................................... 10-267076

(51) Int. Cl.⁷ ................................................. H04J 1/16
(52) U.S. Cl. ..................................... 370/252; 370/389
(58) Field of Search ................................ 370/389, 399, 370/229, 230, 231, 428, 411, 412, 395.21, 695.3, 395.4, 395.41, 395.42, 395.61, 351, 352, 400, 401, 503, 507, 508, 509, 516, 517, 518, 519, 252, 169, 465, 469; 709/232

(56) References Cited

U.S. PATENT DOCUMENTS

6,259,677 B1 * 7/2001 Jain ........................... 370/509
6,259,695 B1 * 7/2001 Ofek .......................... 370/503

FOREIGN PATENT DOCUMENTS

EP  0 666 667 A2   8/1995
EP  0786883 A1    7/1997

OTHER PUBLICATIONS

T. Tanabe, "LAN Analysis Software for Personal Computers: Different Uses and Differences in Operability", Nikkei Communication, No. 155, pp. 70–77, Nikkei BP, Aug. 2, 1993.

M. Onodera, "Sniffer Series' Analyzer for Realizing Maintenance of Optional High Speed Network Environment", Computer & Network LAN, vol. 14, No. 8, pp. 54–58, Ohmsha, Aug. 1, 1996.

M. Yamai, "Increased Necessity Management/Security: From Network Management to System Management", Nikkei Open Systems, No. 28, pp. 390–398, Nikkei BP, Jul. 15, 1995.

M. Yamai, "Chapter 4: Setup of LAN Analyzer Network Management", Open Design, No. 10, Second Edition, pp. 62–73, CQ Publishing, Jun. 15, 1997.

Patent Abstracts of Japan, Pub. No. 07-107157, "Protocol Monitoring Device", Apr. 21, 1995, 6 pp.

Patent Abstracts of Japan, Pub. No. 06-006405, "ISDN Line Monitor Device", Jan. 14, 1994, 7 pp.

Patent Abstracts of Japan, Pub. No. 09-261250, "B-ISDN Channel Monitor", Mar. 10, 1997, 12 pp.

Patent Abstracts of Japan, Pub. No. 10-098504, "Data Processor", Apr. 14, 1998, 11 pp.

Patent Abstracts of Japan, Pub. No. 10-149398, "Map Building System and its Method", Jun. 2, 1998, 12 pp.

Patent Abstracts of Japan, Pub. No. 09-252310, "B-ISDN Channel Monitor Device", Sep. 22, 1997, 13 pp.

Irene Cozzani, et al., "A Passive Test And Measurement System: Traffic Sampling For QOS Evaluation," pp. 1236–1241, 1998 IEEE.

J. Apisdorf, et al., "OC3MON: flexible, affordable, high performance statistics collection", INET'97, Jun., 1997.

* cited by examiner

*Primary Examiner*—Dang Ton
(74) *Attorney, Agent, or Firm*—Burns, Doane, Swecker & Mathis L.L.P.

(57) ABSTRACT

The present invention concerns an apparatus for evaluating the quality of service in a network. The QoS evaluation apparatus includes an arrival detection section to provide a timestamp to a specific processing unit included in a packet that arrives at an attention point in the network and is branched off by duplicating from a switching system. An estimation section estimates the arrival times of the plurality of processing units arriving at the attention point, and a simulation section simulates arrival times corresponding to the estimated arrival times at the attention point, produced by the arrival time estimation section, according to a predetermined logic equation.

16 Claims, 19 Drawing Sheets

| VPI | VCI | CELL COUNT | TIMESTAMP | ACTIVE VC COUNT | BUSY | REFERENCE TIME |
|---|---|---|---|---|---|---|
| 64 | 64 | 2 | 1:00:02 | 3 | 1 | 1:00:00 |
|  | 65 | 1 | 1:00:13 | 1 | 0 | 1:00:11 |

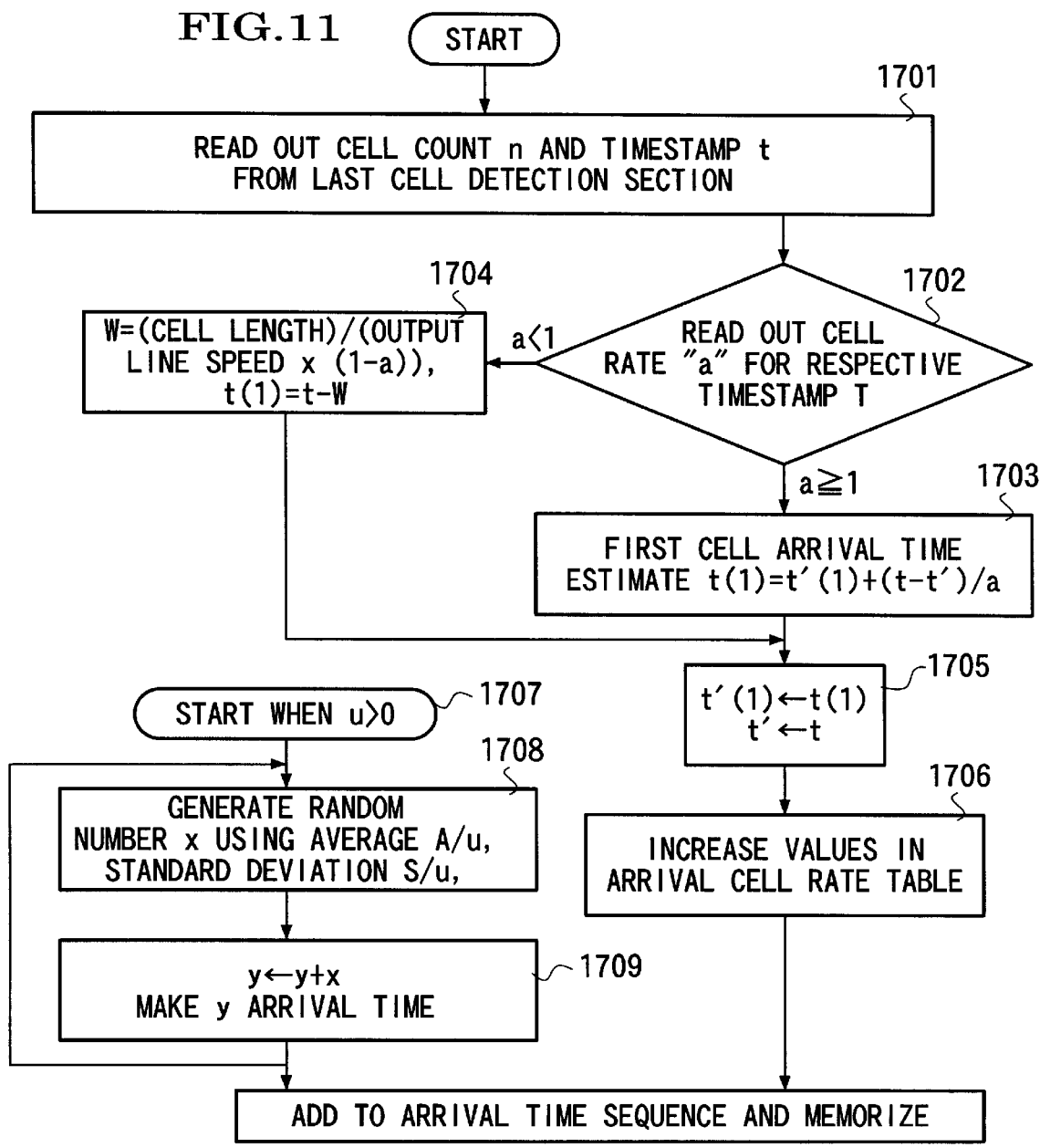

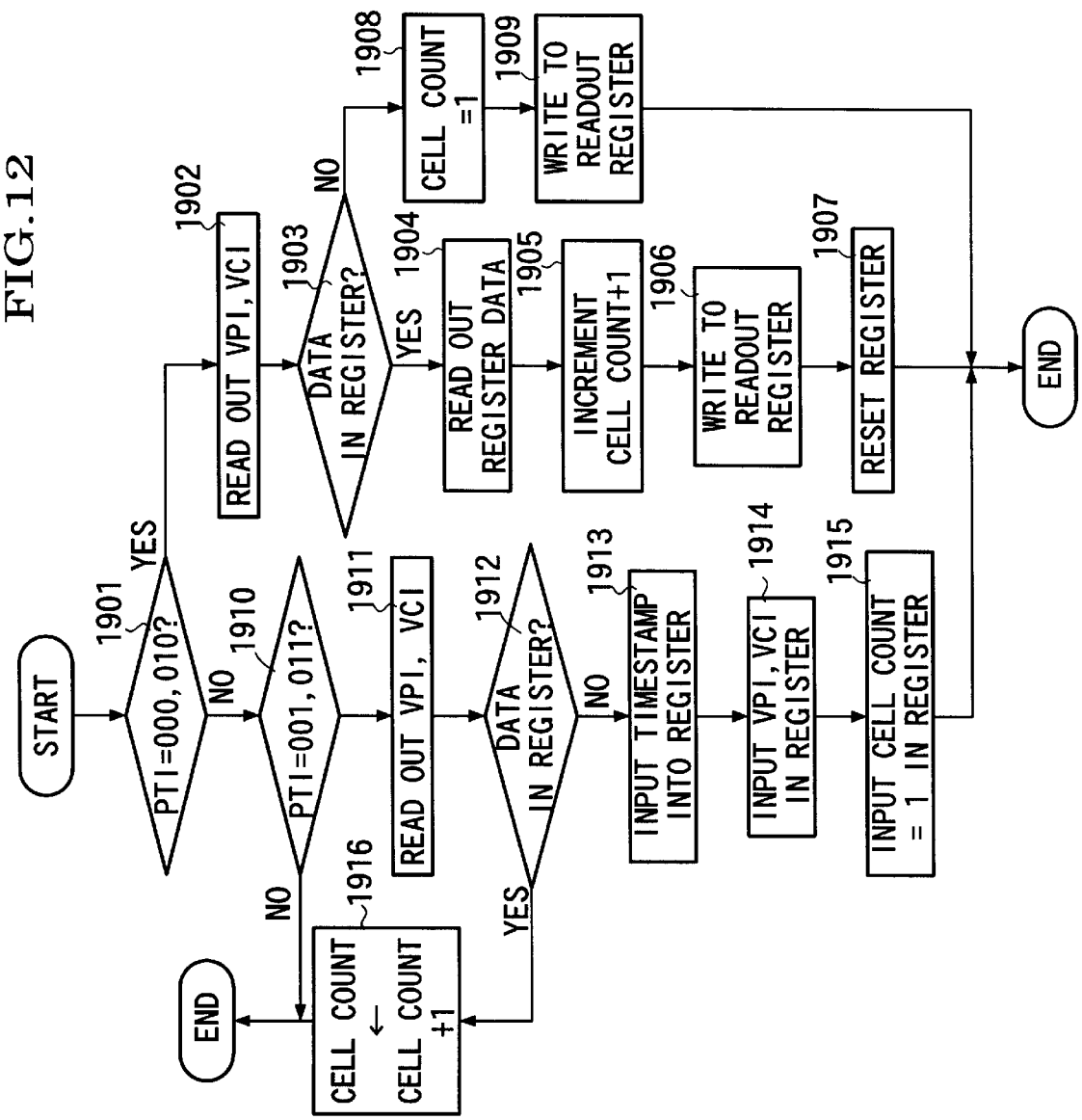

FIG.22

| V P I | V C I | CELL COUNTER | PARAMETER |
|---|---|---|---|
| 28 | 17 | 0 | 1 |
| 32 | 29 | 4 | 1 |
| . | . | . | . |
| . | . | . | . |
| . | . | . | . |

| V P I | V C I | CELL COUNTER | PARAMETER |
|---|---|---|---|
| 128 | 17 | 1 | 120154 |
|  |  | 2 | 10128 |
|  |  | 3 | 11121 |
| 32 | 29 | 1 | 121001 |

APPARATUS FOR QUALITY OF SERVICE EVALUATION AND TRAFFIC MEASUREMENT

BACKGROUND OF THE INVENTION

1. Field of the Invention

The present invention relates to a method of traffic quality evaluation and traffic measurements in packet network and asynchronous transfer mode network. Traffic quality evaluation is utilized primarily for traffic design and confirmation of quality of service evaluation after the system has been constructed. Traffic quality evaluation apparatus observes packets that have been duplicated from the packets passing an attention point between switching systems, and determines arrival time of packet itself or a specific cell contained in the packet, thereby estimating the arrival time of packet or cells contained in the packet as well as loss ratio of cells.

This application is based on patent application No. Hei 10-68772, No. Hei 10-264769 and No. Hei 10-267076 filed in Japan, the contents of which are incorporated herein by reference.

2. Description of the Related Art

In information communication systems, variations in the quality of service such as delays and data loss are produced depending on the traffic intensity. Therefore, to construct an economic and high performance information communication system, quantitative understanding of the relationship between the traffic intensity and the quality performance under a given set of conditions of operating environment, such as buffer size and circuit speed, CPU power, memory and the like, become essential so that an appropriate size of buffer memories, for example, can be provided for optimum performance of the network.

To achieve this end objective, two basic methodologies have been used. The first method is based on simulation. A logic to simulate a target system is assembled into a computer. The computer is then input with statistically processed results obtained from traffic measurement in the actual network system, and traffic based on the results of processing is simulated by generating random numbers, and the resulting quality for the generated traffic is evaluated.

The second method is based on evaluating a mathematical relationship between quality and operating environment such as traffic buffer size obtained by traffic theory. Traffic conditions are derived from statistical processing of traffic measurement in the information network system, as in the first method, or the person evaluating the system selects suitable traffic conditions under certain assumptions. In either method, the evaluation approach is based summarizing the measured results once into a small number of statistics, and analyzing the summarized statistics.

However, these conventional methods present the following problems in providing a quality of service (QoS) evaluation to perform accurate traffic design for a given network.
(1) Traffic measurements in information communication systems lose a lot of information related to the traffic, because of many restrictions in measurement items preprovided in the system, such as measurement duration.
(2) Much information is lost by statistically summarizing the measured traffic results into a small number of prearranged statistical parameters to fit certain probability/statistical model. Actual traffic activities are far more complex than those that can be described by a few parameters of probability/statistical models. Consequently, errors introduced by modeling are such that they cannot be ignored.

Furthermore, traffic measurement techniques are important in contributing significantly to design an economical highspeed network. Methodology for measuring network traffic can be divided into two broad categories: one utilizes devices within the network such as end systems, switches and routers; while the other utilizes external measuring devices. In either case, items to be measured are determined by the devices or softwares provided in the switches and externally attached traffic measuring devices. It is true that some flexibility in choice can be provided when measuring the traffic by application programs in end systems, because they allow modifications to be made to the programs, In such cases, however, it is important to remember that what is being measured is not the traffic within the network, but the traffic that the relevant end system is transmitting and receiving.

Internet and ATM networks are realizing not only monolithic tasks such as voice transmission but a variety of information transmission tasks. Thus, to achieve an effective use of the network capability, it is necessary that the network operators come to clear understanding of the variety of traffic conditions that may exist in the network. However, because the existing measurement devices can provide only fixed traffic items for measurements, it is difficult to perform traffic measurements within a network in a variety of conditions, without exhaustively seeking out all combinations of a variety of traffic measurement conditions. However, it is impossible in practice to respond to all such combinations, considering the limited nature of the processor capability and memory capacity in a given measuring system in existing communication networks.

SUMMARY OF THE INVENTION

The present invention related to the quality of service evaluation has been developed in consideration of the background described above, and an object is to provide an evaluation apparatus to enable traffic measurements without loss of traffic information. Also, another object of the present invention is to provide an evaluation apparatus that enables to evaluate the quality of service without being affected by the modeling.

The object related to the quality of service evaluation has been achieved by the following features disclosed in the present invention.

(1) Raw traffic data are obtained by inserting a splitting device or by using accessing history. Traffic measurement items provided in a communication system are not used.

(2) Raw data obtained are directly input into a simulation model without summarizing into pre-arranged statistical parameters. As a result, near real-time traffic is reproduced. To perform such a simulation continually, the measuring point and the execution section for the simulation logic are connected on-line.

(3) QoS evaluation is performed by simulation and numerical equations are not used.

Specifically, the present QoS evaluation apparatus is provided with means for splitting and accepting the packets passing through an attention point in a switching system, and evaluates the quality of service dependent on by observing the packets splitted off from the network.

The features provided for the present quality of service evaluation apparatus are:

means for accepting a packet passing through an attention point in a switching system and duplicated and splitted at a splitter, and assigning a timestamp to a specific processing unit included in said packet;

means for estimating arrival times of processing units included in said packet at said attention point on a basis of said timestamp for said specific processing unit given by said arrival detection section; and means for simulating arrival time of said packet and processing discipline at said attention point which arrival time to correspond to an estimated arrival time of said packet at said attention point obtained by said estimating section, according to a pre-determined simulation logic.

The switching system is an ATM switching system, and said attention point may be an output-line buffer in said ATM switching system, then said processing unit is a cell and said specific processing unit can be the first cell in an object packet. Or, said processing unit may be a cell, and said specific processing can be an individual cell in an object packet.

In this case, the estimating section may include means for estimating an arrival time of an (i)th cell in said packet according to a relation:

[a timestamp of said first cell+(i−1)×(cell length/input-line speed)], or an estimated arrival time of an (i)th cell comprising said packet may be calculated from a relation:

[an estimated arrival time of said first cell+(i−1)×(cell length/input-line speed)], where said estimated arrival time of said first cell is given by a sum of a base time T' and an estimated value of a time interval required for cells that output from a switching system between a reference time and a timestamp of said first cell to arrive at said attention point.

When cells output from a switching system without creating an idle interval between the first cell of a receding packet and the first cell of said object packet, then said base time is equal to an estimated arrival time of the first cell of the preceding packet, and said reference time is equal to a timestamp of the first cell of the preceding packet; and when there is an idle interval between the first cell of a preceding packet and the first cell of said object packet, then said base time is equal to a reference time, which indicates a time when a most recent idle interval becomes non-idle.

Or, the estimating means is provided with a table that records estimated cell arrival rates at each instant of time, and is provided with a computing section to read out an estimated value "a" corresponding to a time indicated by a timestamp of a packet, and if "a"≧1, an estimated arrival time t(1) for the first cell of an object packet is calculated from a relation: [ail estimated arrival time t'(1) of the first cell of a preceding packet]+[(the object packet timestamp t)−(a preceding packet timestamp t')]/(estimated cell arrival rate "a"); and if "a"<1, an estimated arrival time t(1) for the first cell of an object packet is calculated from a relation: (an arrival time of the first cell of the object packet)+(a waiting time of the first cell of the object packet)=the transmitting time of the first cell of the object packet=a timestamp t of the object packet.

Also, said switching system is a router and said attention point may be a router output-line, then said processing unit is a packet, and said estimating section includes a processing section to calculate an estimated arrival time for an (i+1)th packet so that:

when the completion time of the (i) the packet transmission is followed continually with the starting time of the (i+1) th packet transmission, a relation is used such that: [(i)th packet estimated arrival time+the starting time of the (i+1) th packet transmission]/2, where said the starting time of the (i+1) th packet transmission is obtained by subtracting a value of (packet length of (i+1)th packet)/(output-line speed) from an arrival time of (i+1)th packet; and when the completion time of the (i) the packet transmission is not followed continually with the starting time of the (i+1) th packet transmission, a relation is used such that: (i)th packet estimated arrival time=the starting time of the (i+1) th packet transmission, where said the starting time of the (i+1) th packet transmission is obtained by subtracting a value of (packet length of (i+1)th packet)/(output-line speed) from an arrival time of (i+1)th packet.

Accordingly, QoS evaluation may be performed without suffering loss of traffic information, and without being affected by the effects of errors introduced by modeling. Further, the evaluation process may be carried out without resorting to approximating equations.

An object for the invention related to traffic measurements is to provide a traffic measuring methodology that is flexible to enable to customize traffic measurement items for individual cases of traffic in various communication modes.

The object is achieved by using a traffic measuring apparatus comprising:

a low level layer processing section for performing protocol processing in functional layers including a protocol layer residing immediately below an attention protocol layer in a network for transferring information using a specific processing unit;

an object condition discrimination section for deciding whether or not measurement conditions specified by an application programming interface, known as an API, are satisfied in a data unit that has been subjected to processing in said low level layer processing section; and an operation section for carrying out measuring actions specified by said API for a data unit that has been judged to satisfy said measurement conditions; and an application section for computing desired contents of traffic measurement by manipulating raw data output from said operation section.

It is preferable that the above API is an upper level API that determines parameters for an object to be measured, measurement items and measurement methods, in terms of user-friendly terms such as addresses or protocol types in each protocol layer, protocol data units in each protocol layer.

In this case, the traffic measuring apparatus is further provided with an API conversion section for converting upper level APIs that determine user-friendly parameters to a general purpose API for purposes of taking traffic measurements. In this case, said object condition discrimination section and said operation section use said general purpose API in place of said upper level APIs.

Also, it is preferable that an API used by said operation section is a logic equation based on bit values and time information contained in data units.

Accordingly, one evaluation apparatus is able to provide traffic measurements that can be customized to the needs of individual cases of various communication modes.

BRIEF DESCRIPTION OF THE DRAWINGS

FIG. 10 is a table showing estimated cell arrival rates at successive instances of time.

FIG. 11 is a flowchart showing a process of generating a train of cell arrival time sequence in a second embodiment of the QoS evaluation apparatus.

FIG. 12 a flowchart showing processing steps in the VPI/VCI/PTI detection section in a second embodiment of the QoS evaluation apparatus.

FIG. 22 is an example of a cell counter for each VPI/VCI pair used by the state managing section 41 in the traffic measuring apparatus.

FIG. 23 is an example of a memory address table 53 used by the state managing section 41 in the traffic measuring apparatus.

DESCRIPTION OF THE PREFERRED EMBODIMENTS

The following embodiments are not meant to limit the invention disclosed in the claims. Also, it should be noted that all combinations of the features presented in the embodiments are not necessarily required to achieve the purpose of the present invention.

The present invention, relating to quality of service evaluation and measurements of traffic, is utilized in networks such as packet networks and ATM networks to transmit data units identified by specific header/trailer bits. A packet or a cell is an example of data units, having a header or a trailer, for the purpose of transmitting multi-media information.

First, a method for QoS evaluation will be explained, followed later by explanation of the apparatus for traffic measurements.

Figure 1:
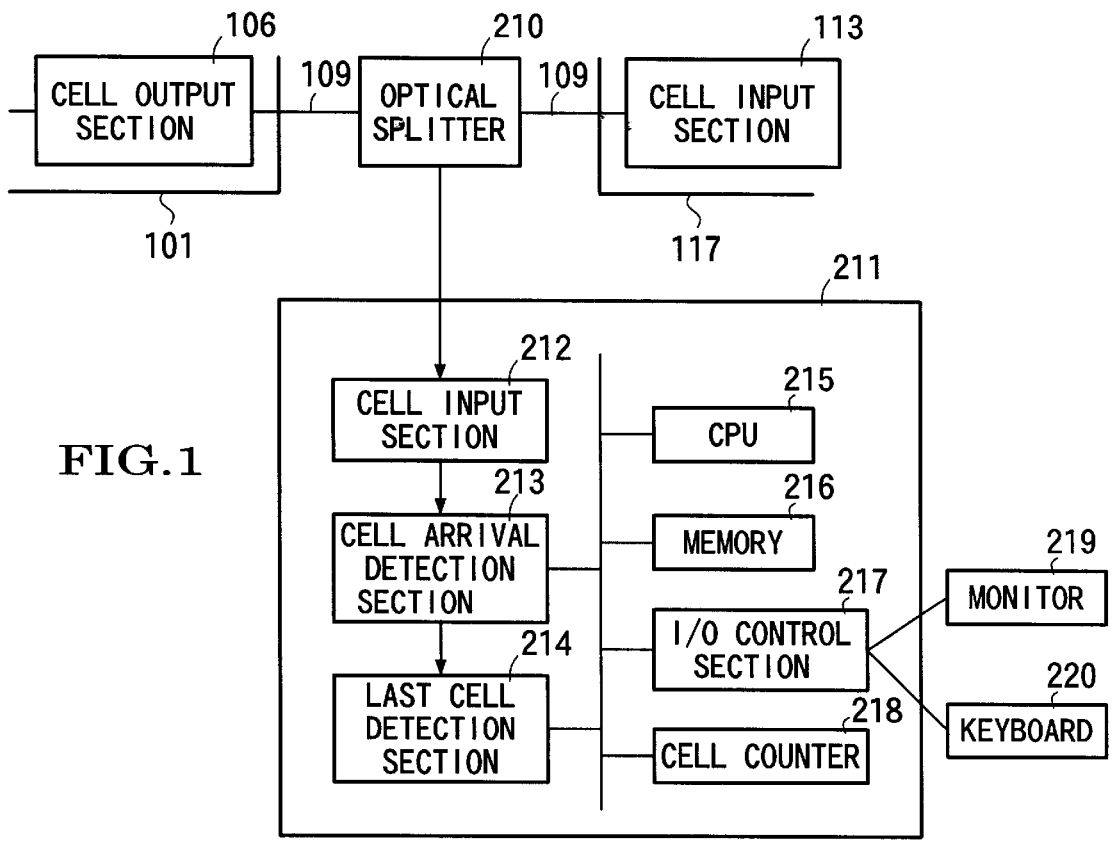
FIG. 1 is a block diagram of the configuration of the essential parts of the QoS evaluation apparatus of the present invention.
Figure 2:
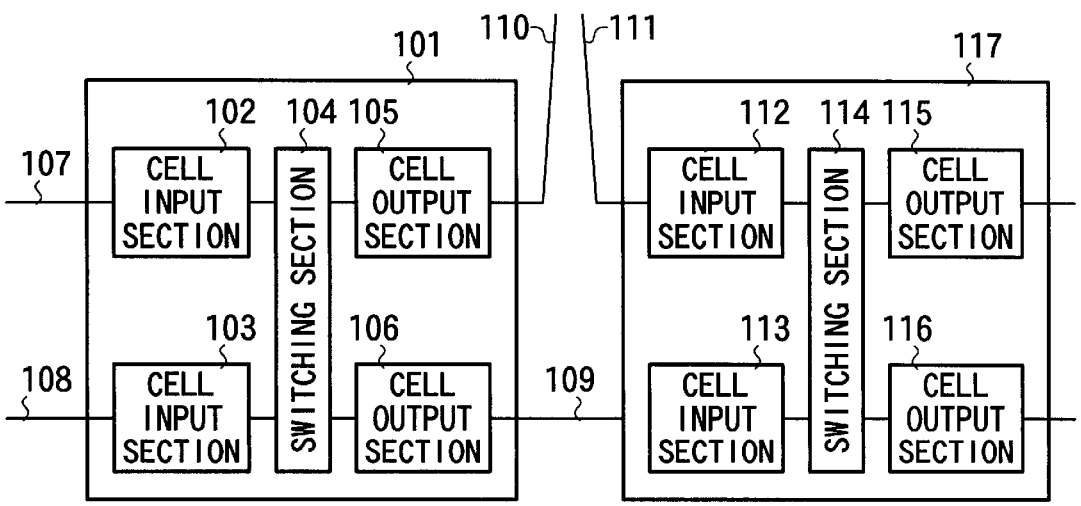
FIG. 2 is a block diagram of tile configuration of the essential parts of an ATM switching system for traffic design.

An embodiment of the QoS evaluation apparatus will be presented with reference to FIGS. 1 and 2. FIG. 1 is a block diagram of the configuration of the essential parts of the evaluation apparatus, and FIG. 2 is a block diagram of the configuration of the essential parts of ATM switching systems 101, 117 which are ,target systems for traffic design. A first embodiment of the evaluation apparatus will be explained below.

As shown in FIG. 1, the evaluation apparatus 211 monitors and evaluates the quality of service dependent on traffic in the target line 109 from the ATM switching systems 101, 117, by splitting the packets passing through the line 109 using an optical splitting device 210.

The features of the present apparatus include a cell arrival detection section 213 for estimating the arrival time of a specific cell in a packet input from the optical splitter 210 and arriving at the line 109, and attaching a timestamp to the specific cell; and a CPU 215 to estimate the arrival times at an attention point of the many cells contained in the packet, according to the timestamp that was given by the cell arrival detection section 213 on the specific cell. CPU 215 then performs a simulation of the system with cells arriving at the estimated arrival times according to a pre-determined simulation logic.

In other words, CPU 215 functions not only as an estimation section to estimate the arrival times by executing a certain pre-loaded program but also as a simulation section to simulate the system according to the simulation logic.

In the first to third embodiments, the specific cell is the first cell in an object packet, and the cell arrival detection section 213 identifies the arrival time of the first cell at the line 109 as the first cell arrival time.

First Embodiment

In the first embodiment, the evaluation apparatus evaluates the quality of service when the traffic intensity is increased beyond a certain level (indicated by such performance factors as cell loss ratio caused by buffer overflow), the line speed of the line 109 (joining the ATM exchangers, 101 and 117 shown in FIG. 1) changes, and the buffer capacity changes in the cell output section 106 serving as an output buffer for output data to line 109.

As shown in FIG. 2, ATM switching system exchanger 101, 117 include, respectively: cell input sections 101, 103 and 112, 113; switching sections 104, 114; cell output sections 105, 106 and 115, 116. Data are received through input-lines 107, 108 and the respective cell input sections 102, 103, 112, 113; switched in the switching sections 104, 114; and are output from the respective cell output sections 105, 106 and 115, 116 to output-lines 109, 110 in this case. A low level layer (physical layer) function is provided in the cell output sections 105, 106, 115, 116 for outputting data to the buffer and output-lines.

The case of applying the evaluation system to the data flowing in line 109 will be explained. As shown in FIG. 1, an optical splitter 210 is inserted in line 109, and the data traffic (cells) flowing in the line 109 is branched off optically. By so doing, cells flowing in line 109 will continue to flow unabated, but the same cells are brought from the optical splitter 210 to the evaluation apparatus 211. The duplicated cells are subjected to such processing such as low-level layer termination in the cell input section 212, and arrive at the cell arrival detection section 213. In the cell arrival detection section 213, payload of the arrived cells are removed, cells are timestamped and are sent to the last cell detection section 214.

Figures 3, 4:
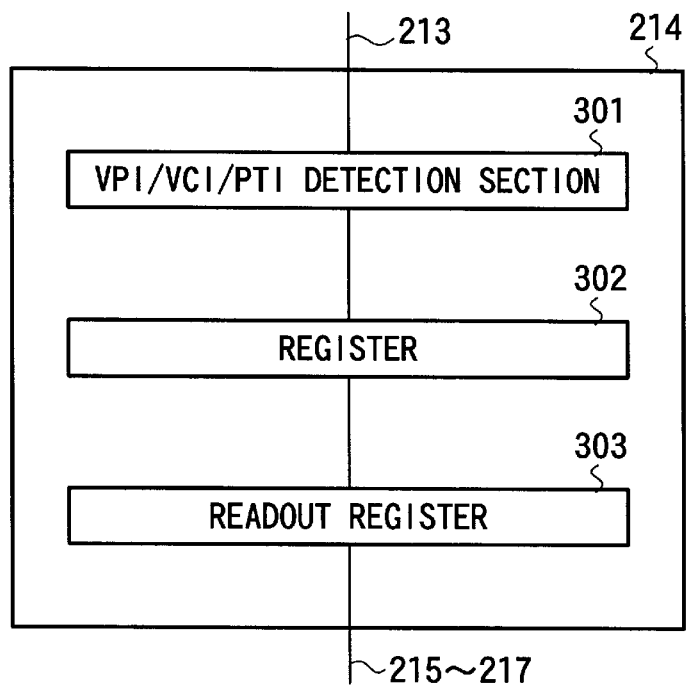
FIG. 3 is a block diagram of the configuration of the essential parts of a last cell detection section.
FIG. 4 is an example of the configuration of a register

FIG. 3 shows a block diagram of the configuration of the essential parts of the last cell detection section 214. Last cell detection section 214 is comprised by a VPI/VCI/PTI detection section 301; a cell info register 302 and a readout register 303, as shown in FIG. 3. Here, a virtual path identifier, VPI, is an identifier information to specify a virtual path; a virtual channel identifier, VCI, specifies a Virtual channel within the path specified by a VPI; and a payload type identifier, PTI, is sometimes called PTF (payload type field) and specifies the type of information within the cell.

Figure 9:
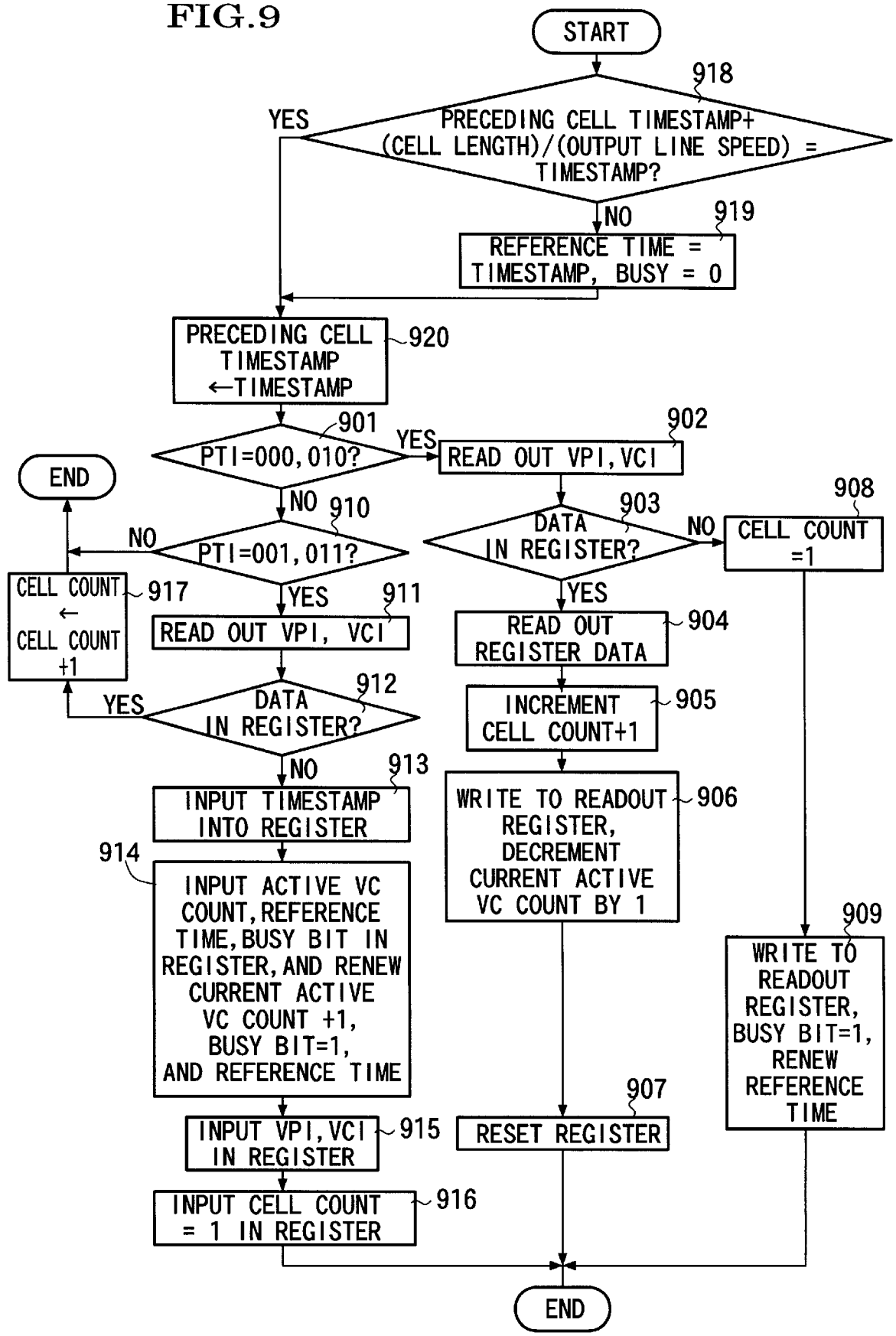
FIG. 9 is a flowchart showing the processing steps in the VPI/VCI/PTI detection section.

FIG. 4 shows the structure of the cell info register 302. As shown in FIG. 4, VPI/VCI/cell count/timestamp/active VC count/busy bit/reference time are held in the cell info register 362. However, active VC count/busy bit/reference time are necessary in plan 2 (to be described later) shown in FIG. 7, but are not necessary in plan 1. FIG. 9 is a flowchart showing the processing steps in VPI/VCI/PTI detection section 301. When the VPI/VCI/PTI detection section 301 in the last cell detection section 214 receives a cell header with a timestamp, the steps shown in FIG. 9 are performed. Only in plan 2, steps 918~920 and processing steps for active VC count and reference time, busy bit become necessary. For this purpose, current values for active VC count, reference time, and busy bit are constantly held in the apparatus memory 216.

The VPI/VCI/PTI detection section 301 determines whether or not a cell is occupying the buffer of the cell output section 106 according to whether the difference between the preceding cell timestamp and the current cell timestamp is equal to the difference in one cell sending time (918). In reality, time difference corresponding to fluctuation in the overhead of the low level layer may be accepted. If the time difference is not equal to the one cell difference, the value of the current cell timestamp is entered in the reference time in the apparatus memory 216, and "0" is entered in the busy bit to indicate that a cell is not in the buffer (919). For 1-cell time difference detection purpose, [previous cell timestamp] is renewed (920).

The VPI/VCI/PTI detection section 301 begins detection of VPI/VCI/PTI bits. First, the PTI region is read, and when 000 or 010 is detected indicating the cell is the last cell in the data packet (901), VPI/VCI of the object cell is read (902), and if there is register data having the same VPI/VCI as the VPI/VCI of the object cell (903), its content is read out (904). This case corresponds to the last cell of a packet containing more than two cells. "1" is added to the cell count in the cell info register 302 (905), and timestamp/active VC count/busy bit/reference time which were stored in the cell info register 302 are written to the readout register 303. The current value of active VC count in memory 216 is reduced by "1" (906). The content of the readout register 303 is read by CPU 215. Relevant data of the VPI/VCI in the cell info register 302 are deleted (907). If there are no data in the register 302 (903), this means that 1 packet consists of a single cell. So, set cell count=1 (908), and the time'stamp attached to the cell header and the current value of active VC count in memory 216 are taken as the active VC count, which are respectively written to the readout register 303, and the busy bit is set to "1" and the timestamp in the cell is entered as the reference time (909).

If, on the other hand, PTI=001, 011 (910), it indicates that the cell in the packet is a not the last cell, and the following areperformed. The VPI/VCI in the cell header are read out (911), and it is checked to see if there is information in the cell info register 302 to correspond to the object VPI/VCI (912). If there is, this is a non-first cell (non-tail cell), the cell count of the data is incremented by "1" (917), and the process is finished. If there are no register data, it means that this is a first cell (non-tail cell), so that a new entry is created in the cell info register 302 (913~916). Specifically, VPI/VCI are entered (915), cell count (916) is initialized, the timestamp attached to the cell header is entered as the timestamp value (913), the current value of the active VC count in memory 216 is entered as the active VC count of the cell into register 302, and the current value of the active VC in memory 216 is incremented by "1". In the busy bit region and reference time region of the cell info register 302, values of the current busy bit and the reference time are entered. The content of memory 216 is renewed by setting busy bit to "1", and entering the value of the timestamp of the object cell as the reference time in memory 216 (914).

By the actions of the last cell detection section 214, every time a last cell is detected, information for a packet having the object cell as the last cell is written into the readout register 303 (i.e. the timestamp of the first cell, the cell count, active VC count, bit value of the busy bit at the arrival time of the first cell of the object packet). The state of the busy bit at the arrival time of the first cell indicates whether or not the buffer had become vacant since the first cell of the preceding packet. If it had become empty, the reference time of the packet indicates a vacancy-end time immediately prior to the first cell of the packet; and if the buffer had not become empty, it indicates a transmitting-time of the first cell of the preceding packet. Such information is read by CPU 215, and it is used in the QoS evaluation process described in the following.

Figure 5:
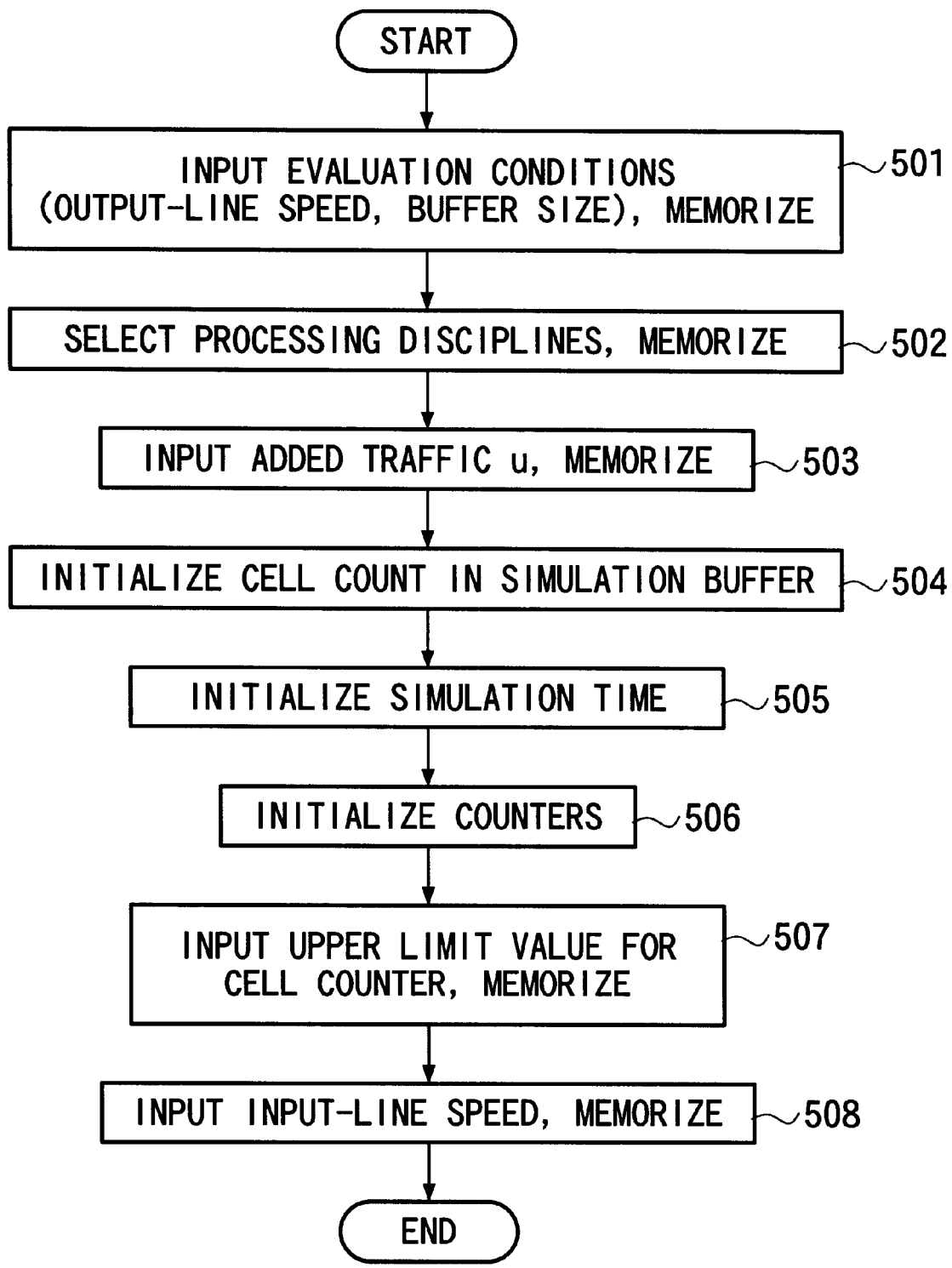
FIG. 5 is a flowchart for an initialization process of the QoS evaluation apparatus.

FIG. 5 is a flowchart showing the initialization process of evaluation apparatus 211. First, the apparatus is prepared for operation by carrying out the initializing steps shown in FIG. 5. Next, desired evaluation conditions, output-line speed and buffer size, are entered through the keyboard 220, and the instructions provided through the I/O control section 217 are read and memorized in the apparatus memory 216 by CPU 215 (501). Similarly, a processing disciplines in the cell output section (representative methods such as FIFO, HOL are prepared) is selected through the keyboard 220 (502). Additional traffic in the evaluation process is also entered (503) by specifying an increase (100 u %) in addition to the actually observed traffic. The number of cells in the buffer of the simulation is initialized (normally to 0) prior to performing quality evaluation by simulation (504). Simulation duration is normally initialized to [(current time of the system to be evaluated)−(buffer size)×(cell length)/(output-line speed)] (505). Cell counter 218 for obtaining statistical details for additional traffic generation is initialized (506), and the upper limit of the counter for resetting the counter is entered through the keyboard 220, which limit is memorized in the apparatus memory 216 by CPU 215 (507). Speed (bandwidth) for the input-lines 107, 108 is similarly input and memorized (508).

Processing steps for obtaining statistical details for generating additional traffic in the evaluation apparatus 211 will be explained with reference to FIG. 6. First, CPU 215 sets the timer and counter 218 to "0" (601, 602) for this process. The number of cells is counted by the cell counter 218 (603). When the cell count reaches N (604), the corresponding timer value is read out (605). This timer value relates to the inter-arrival time of N cells. When M intervals are accumulated (606), then, CPU 215 calculates an average packet arrival interval A and a standard deviation S based on this information (607).

Figure 7:
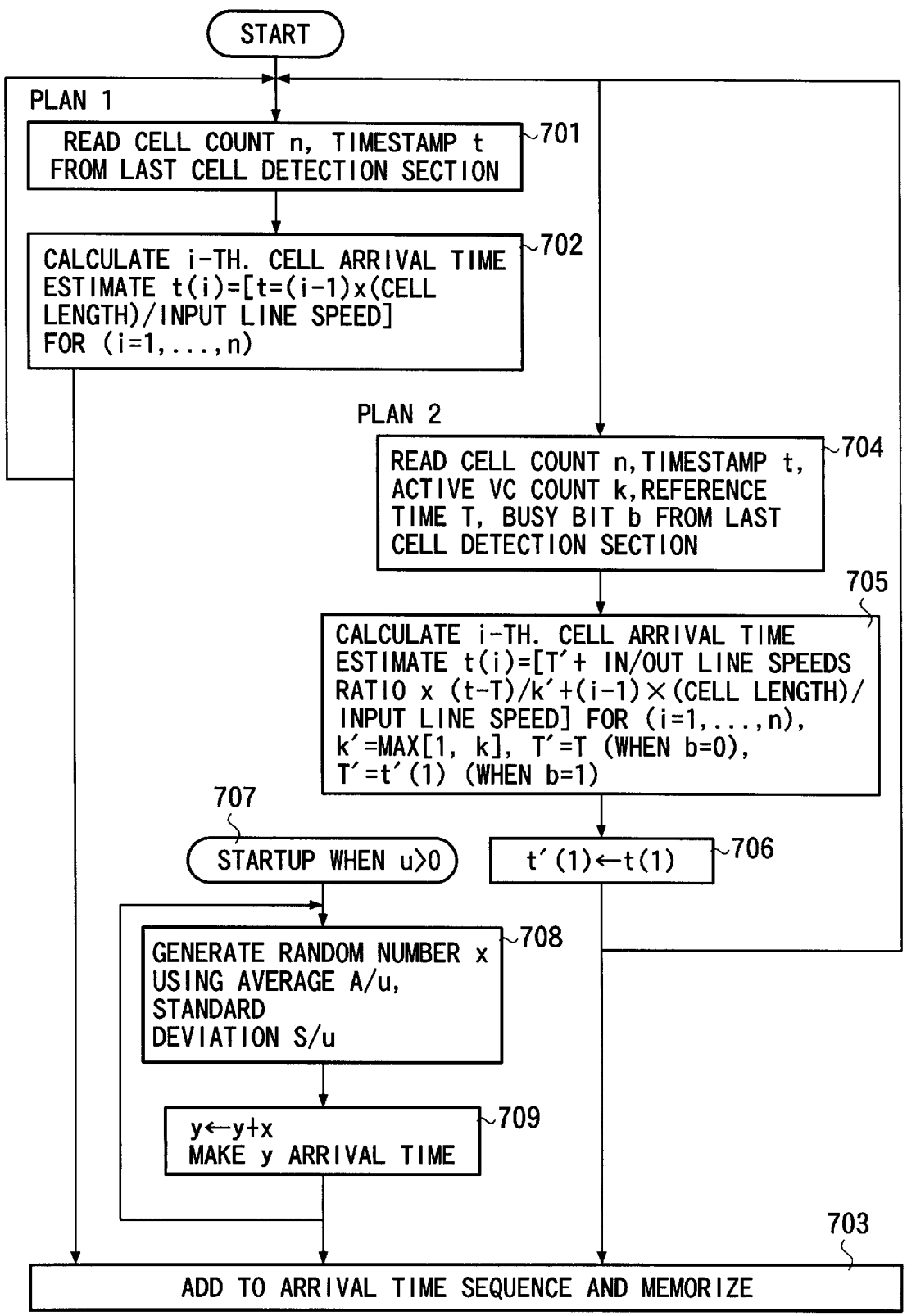
FIG. 7 is a flowchart for a process of generating a train of cell arrival time sequence.
Figure 8:
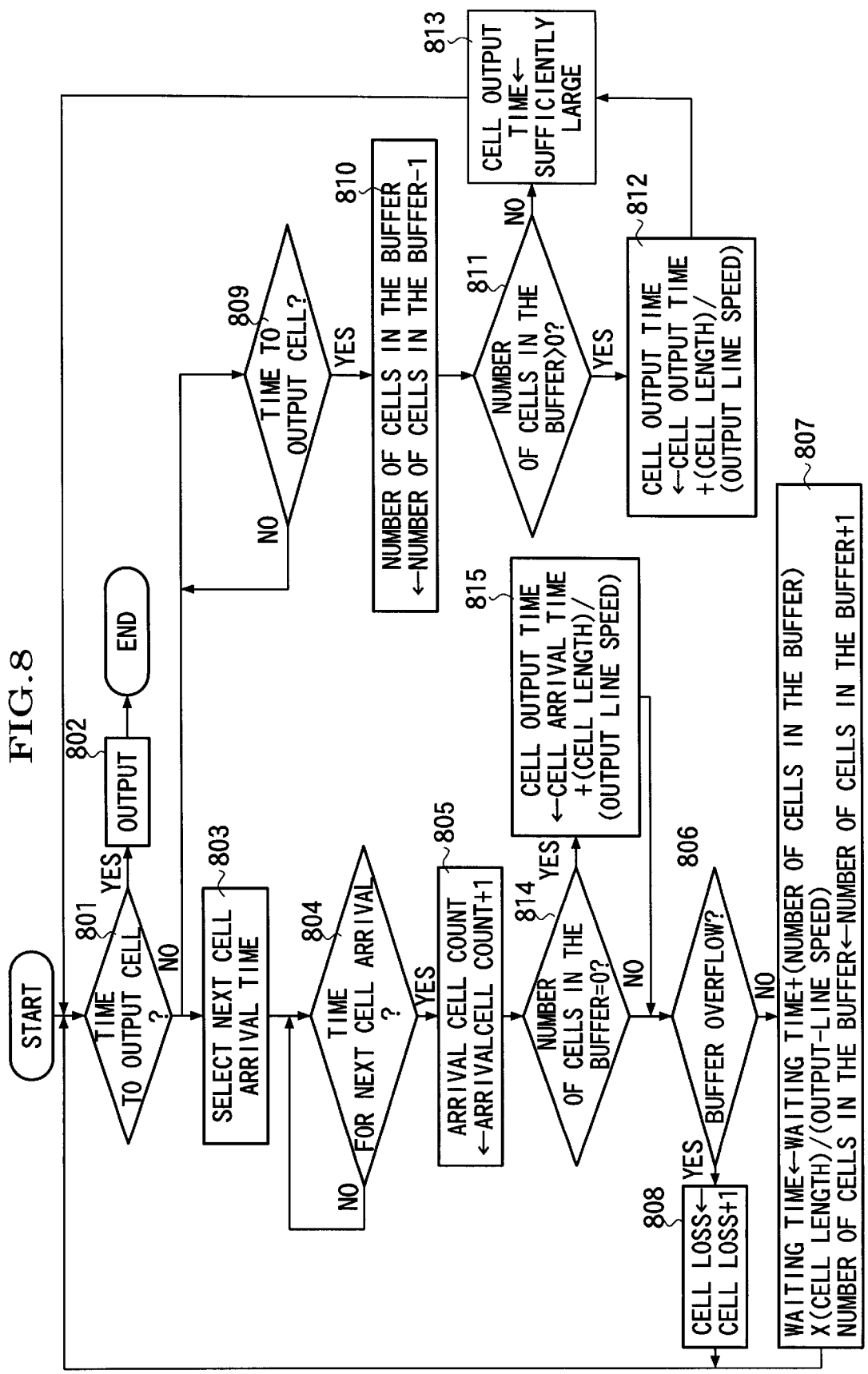
FIG. 8 is a flowchart for a process of simulating the performance evaluation based on the cell arrival time sequence.

An evaluation method using this information will be explained with reference to FIGS. 7 and 8. FIG. 7 relates to a method for forming a cell arrival sequence by using CPU 215 (estimation section). FIG. 8 relates to a method for performance evaluation through a simulation by CPU 215 (simulation section) based on the cell arrival sequence.

In FIG. 7, there are two plans shown for forming a train of cell arrival times. Plan 1 is a relatively convenient method, and does not required active VC count, busy bit, or reference time. Plan 2 is more precise compared to Plan 1 particularly when the traffic volume is heavy.

In plan 1, CPU 215 reads a cell count n and a timestamp t from the readout register 303 inside last cell detection section 313 (701). Based on t and n, CPU 215 calculates an estimated arrival time t(i) for the (i)th cell of the packet, for i=1, ..., n, from [t+(i−1)×(cell length)/input-line speed] (702), and adds the calculation results t(n) to respective elements in the arrival times sequence, and memorizes (703). The input-line speed is stored in step 508 in the apparatus memory 216. The cell length is a fixed value and is prestored in apparatus memory 216.

In plan 2, CPU 215 reads a cell count n, a timestamp t, an active VC count k, a busy bit b, a reference time T from the readout register 303 inside the last cell detection section 313 (704). Based on t, n, k, b and T, CPU 215 calculates an estimated arrival time t(i) for the (i)th. cell, of the packet for i=1, ..., n, from [T'+(ratio of output to input-line speeds)× (t−T)/k'+(i−1)×(cell length)/input-line speed] (705), where, T' is the base time, k'=max(1, k), and t'(1) is an estimated cell arrival time of the first cell of the preceding packet, and the base time T' is equal to the reference time T when b=0, and is equal to t'(1) when b=1. In other words, if the buffer becomes idle, the base time is the next time the buffer becomes non-idle next. If the buffer does not become idle, the base time is the estimated arrival time of the first cell of the preceding packet.

The second term is an approximation of, (output cell count during an interval t−T)/(input cell rate), and indicates the time required to input the number of cells output during the interval (t−T). Therefore, it is possible to estimate the arrival time of the first cell of the packet by using the first and second terms. The arrival times of the succeeding cells inside the packet can be obtained by adding a third term. The term t'(1) is renewed for every packet (706). The values of t(1), ..., t(n) obtained in step 705 are added to arrival time sequence and memorized.

Plans 1 and 2 both relate to forming a cell arrival time sequence under the current traffic. Simulation for an increase in traffic is performed through the steps 707~709 to create an additional part of the cell arrival time sequence. This process is started up only when there is an increase (u>0) in the traffic (707). In the process shown in FIG. 6, an average value A and a standard deviation S of the cell arrival interval under the current traffic condition are obtained. While maintaining a coefficient of variation S/A, and a random number x which is distributed with mean A/u and standard deviation S/u is generated so that the average number of arriving cells is increased by an amount equal to 100 u %. This random number x is used as a cell interarrival time, for the additional traffic (708). It is possible to generate random numbers of a desired statistical property by choosing the H2 distribution if S/A>1, using the Poisson distribution if S/A=1, and using the Earlang distribution if S/A<1. The generated random number x is taken as the cell arrival interval, and is added to the arrival time y of the pervious cell to obtain the cell arrival time (709). This arrival time is added to the arrival time sequence and is memorized (703).

By following the process shown in FIG. 7, CPU 215 accumulates cell arrival time sequence, which is constantly updated. A simulation method for QoS evaluation based on such results will be explained with reference to FIG. 8. As an example, the explanation assumes that the FIFO method is selected through the keyboard 502 for the cell output processing rule. It would be possible to devise a similar process when other disciplines are chosen. Therefore, it will not be explained here. Because it is necessary to prepare a simulation logic beforehand to suit each processing discipline, the operator must choose a processing discipline from a prepared list of choices.

CPU 215 selects the closest arrival time from the cell arrival time sequence as the next cell arrival time to the attention point (803). When the arrival time is reached (804), "1" is added to the arrival cell count (805). When there is no cell in the buffer (814), the transmitting time of the cell just arriving is taken as the next cell transmitting time, i.e., [arrival time+(cell length)/(output-line speed)] (815). When the arriving cell overflows the buffer (806), cell loss is incremented by "1" (808), and when the buffer does not overflow, the accumulated waiting time is updated, and the number of cells in the buffer is incremented by "1" (807).

When a cell transmitting time is reached (809), the number of cell in the buffer is decremented by "1" (810). If the buffer becomes idle as a result of this step (811), cell transmitting time is chosen to be a sufficiently large value (813). This value is renewed when a cell arrives. When there are cells remaining in the buffer (811), [current cell transmitting time+(cell length)/(output-line speed)] is taken as the next cell transmitting time (812). Cell loss count, accumulated waiting time, arrival cell count, obtained as the result of the simulation process, are output through the I/O section control section 217 to the monitor 219 at a certain interval (802). As necessary, the results are converted to cell loss ratio (=cell loss count/arrival cell count), average waiting time (=accumulated waiting time/(arrival cell count-cell loss count)), and are output.

In both plan 1 and plan 2, arrival times of the cells to the respective output-line buffer are estimated by detecting the last cell using the last cell detection section 214, which results in detecting the first cell, and thereby assigning a timestamp to each packet. In contract, it is possible to consider estimating the cell arrival times to respective output-line buffer according to the timestamp assigned to each cell given by the cell arrival detection section 213.

Usually, when a timestamp for each cell is used, the last cell detection section 214 is not necessary. The easiest way to estimate the arrival time of each cell to the respective output-line buffer based on the timestamp for each cell, is to use the timestamp of each cell as the estimated arrival time to the respective output-line buffer.

In other words, CPU 215 reads the timestamp given to each cell by the cell arrival detection section 213, and adds it to the arrival time sequence. In this case, the technique for forming the arrival time sequence for the additional traffic is the same as described earlier. Based on this approach, QoS evaluation simulation can be performed following the same steps described earlier.

In the first embodiment, the processes shown in FIGS. 5 to 8 are performed by having CPU 215 executing a suitable computer-executable program (not shown). Also, high operational speeds are necessary for the cell arrival detection section 213 and last cell detection section 214, so that it is preferable to use dedicated hardwares. However, if the processing speed of CPU 215 is sufficiently high, CPU 215 may execute the program to provide the functions of cell arrival detection section 213 and last cell detection section 214.

Second Embodiment

A QoS evaluation apparatus of the second embodiment is similar to the apparatus in the first embodiment and is related to evaluating the quality (cell loss caused by buffer overflow and the like) of the network when the traffic is increased by a certain amount, the line speed of line 109 communicating between ATM switching systems 101, 117 changes and the number of buffers in the output buffer to line 109 in the output section 106 changes.

The point of difference in the two embodiments is that the requirement for renewal of timestamp and busy bit for every cell in the first embodiment is now carried out for every packet in the second embodiment.

The second embodiment will be explained with reference to FIGS. 10 to 12. FIG. 10 is a table showing the estimated values of cell arrival rate. FIG. 11 is a flowchart showing the steps for forming the cell arrival time sequence by CPU 215 (estimation section). FIG. 12 is a flowchart showing the processing steps performed in the VPI/VCI/PTI detection section 301.

The VPI/VCI/PTI detection section 301 in the final cell detection section receiving a cell header having timestamp performs the steps shown in FIG. 12. In addition to holding VPI/VCI/cell count, the cell info register 302 stores a table of estimated values of cell arrival rates corresponding to various instances of time as shown in FIG. 10.

The VPI/VCI/PTI detection section 301 starts detection of VPI/VCI/PTI bits. First, PTI region is read. When 000, 010 to indicate the last cell in the data packet is detected (1901), VPI/VCI in this cell are read (1902). If there is information of which VPI/VCI is the same as the relevant VPI/VCI in the cell info register 302 (1903), this information is read out (1904). This case corresponds to the last cell of a packet having more than two cells. The cell count in the cell info register 302 is incremented by "1" (1905), and this result together with the timestamp stored in the cell info register 302 is written to the readout register 303 (1906). The content of the readout register 303 is read by CPU 215. The object VPI/VCI in the cell info register 302 is deleted (1907). If there is no data in the cell info register 302 (1903), this case corresponds to one packet having one cell. So, the cell count=1 (1908) and the timestamp added to the cell header is read out and is written to the register 302 (1909).

On the other hand, if PTI=001, 011 (1910), it indicates that the data in the packet is not the last cell, so the followings are performed contents are treated accordingly. The VPI/VCI in the cell header are read out (1911), and it is checked to see if there is data in the cell info register 302 to correspond to the object VPI/VCI (912). If there is, this is a non-first cell (non-tail cell), the cell count in the data is incremented by "1" (1917), and the processing is finished. If there is no relevant register data in the cell info register 302, it means that this is the first cell (non-tail cell), and a new entry is created in the cell info register 302 (1913–1916). Specifically, VPI/VCI (1915) are entered, cell count is initialized (1916), and the timestamp attached to the cell header is entered as the timestamp in the cell info register (1913). In the first embodiment, active VC count, busy bit region and reference time region are required, but there is no such requirement in the second embodiment.

By the actions of the final cell detection section 214, for each detection of the final cell, a cell count and a timestamp of the packet having the detected final cell as the last cell are written to the readout register 303. Here, the timestamp of a packet is the timestamp of the first cell of the packet. In the method described above, the number of cells of the packet was obtained from the ATM cell header, but it is permissible to determine the number of cells of the packet from the packet length field in the packet header, which field locates in a certain location of the payload of the first cell.

Then, quality evaluation is performed using the timestamp and cell count in each packet. First, the apparatus is prepared by carrying out the initializing steps shown in FIG. 5. Next, the evaluation conditions, output-line speed and buffer size, are entered through the keyboard 220, and the instructions provided through the I/O control section 217 are read and memorized in the apparatus memory 216 by CPU 215 (501). Similarly, a processing discipline the cell output section (representative methods such as FIFO, HOL are prepared for selection) is selected through the keyboard 202 (502). An increase (100 u %) in traffic over the current traffic is also entered (503). The number of cells in the buffer in simulation for quality evaluation is initialized (normally to 0) (504). Simulation time is normally initialized to [(current time of the system to be evaluated–(buffer size)×(cell length)/(output-line speed) )](505). Cell counter 218 for obtaining statistical details for generating additional traffic is initialized (506), and the upper limit of the counter for resetting the counter is entered through the keyboard 220, which is memorized in the apparatus memory 216 by CPU 215 (507). Speed (bandwidth) for the input-lines 107, 108 are similarly input and memorized (508).

Further, processing steps for obtaining statistical details for additional traffic generation in the evaluation apparatus 211 will be explained with reference to FIG. 6. In the following, average cell arrival times and standard deviation are obtained from the counter, it is possible to use a similarity method based on the number of cells in the packet and timestamp in the packet. First, CPU 215 sets the timer and counter 218 to "0" (601, 602) for this process. Cell counts are made by the cell counter 218 (603). When the cell count reaches N (604), the corresponding timer value is read out (605). This timer value relates to an interval for arrival of N cells. When M intervals are accumulated (606), then, based on this information, CPU 215 calculates an average cell arrival interval A and a standard deviation S (607).

An evaluation method using the information obtained above will be explained with reference to FIGS. 11 and 18. In the arrival time sequence formation method shown in FIG. 11, CPU 215 obtains cell count n, timestamp t from the readout register 303 inside the final cell detection section 214 (1701). CPU 215 has a table of estimated cell arrival rates, such as the one shown in FIG. 10 corresponding to each instance of time. An estimated value "a" of a cell arrival rate at the instance shown by the timestamp in the object packet is read out. If a≧1 (1702), an estimated arrival time t(1) of the first cell of the object packet is calculated as [[estimated arrival time t'(1) of first cell of the preceding packet]+[difference in arrival times of the first cells in the preceding packet and in the object packet]]. The "difference in arrival times of the first cell in the preciding packet and in the object packet" is estimated from [([object packet timestamp t]−[previous packet timestamp t']/cell arrival rate estimate a]. That is, the relation is $[t(1)=t'(1)+[t−t']/a]$ (1703). If the estimated rate a<1 (1702), estimated arrival time of first cell t(1) is obtained on the basis of [[arrival time of the first cell of the object packet]+[waiting time of the first cell of the object packet]=[transmitting time of the first cell of the object packet]=[timestamp t of the object packet]]. The estimate w for [ waiting time of the first cell of the object packet] may be derived by using an average waiting time or a 95% value of an M/M/1 queueing model with the arrival rate a. In FIG. 11, it is assumed to use the average waiting time in an M/M/1 queueing model, that is, (cell length)/(output-line speed×(1−a)) (1704). This leads to a relation t(1)=[timestamp t in the object packet]−w (1704). At this time, preceding packet timestamp and estimated value of the first cell arrival time in the preceding packet are renewed (1705).

The time required for the n cells composing the packet to arrive from the input-line is [n(cell length/input-line speed)]. Based on this, estimated cell arrival rates between time t(1) and time t(1)+n(cell length/input-line speed), in the table of estimated the cell arrival rates in CPU 215 shown in FIG. 10, are increased by an amount equal to (input-line speed/cell length) (1706).

After a delay time of a pre-determined amount, cells are randomly generated so as to be consistent with the estimated values of the cell arrival rates at various instances of time.

In addition, a cell arrival time sequence is formed under some increased traffic condition in steps 1707~1709. Only when there is an increase in the traffic (u>0), this process is started up (1707). In the process shown in FIG. 6, an average value A and standard deviation S of the cell arrival interval under the current traffic condition is obtained. While maintaining the coefficient variation S/A, a random number x which is distributed with mean A/u and standard deviation S/u is generated so that the average values are increased by an amount equal to 100 u %. This random number x is used as a cell arrival time interval for the increased traffic amount (1708). It is possible to generate random numbers of a desired statistical property by choosing the H2 distribution if S/A>1, using Poisson distribution if S/A=1, and using Earlang distribution if S/A<1. The generated random number x is taken as the cell arrival interval of the increased cell traffic, and is added to the arrival time y of the pervious cell to obtain the current cell arrival time (1709). This arrival time is added to the arrival time sequence and is memorized (1703).

By following the steps shown in FIG. 11, CPU 215 obtains an arrival time sequence which is updated constantly. As in the case of the first embodiment, quality evaluation simulation is performed based on the results according to FIG. 8.

In the second embodiment, the processes shown in FIGS. 5, 6, 8 and 11 are performed by having CPU 215 executing a program (not shown). Also, it is necessary for the cell arrival detection section 213 and the last cell detection section 214 to perform at high speeds, so that dedicated hardwares should be used. However, if the processing speed of CPU 215 is sufficiently high, CPU 215 may execute the program to function as the cell arrival detection section 213 and the last cell detection section 214.

Third Embodiment

Figure 13:
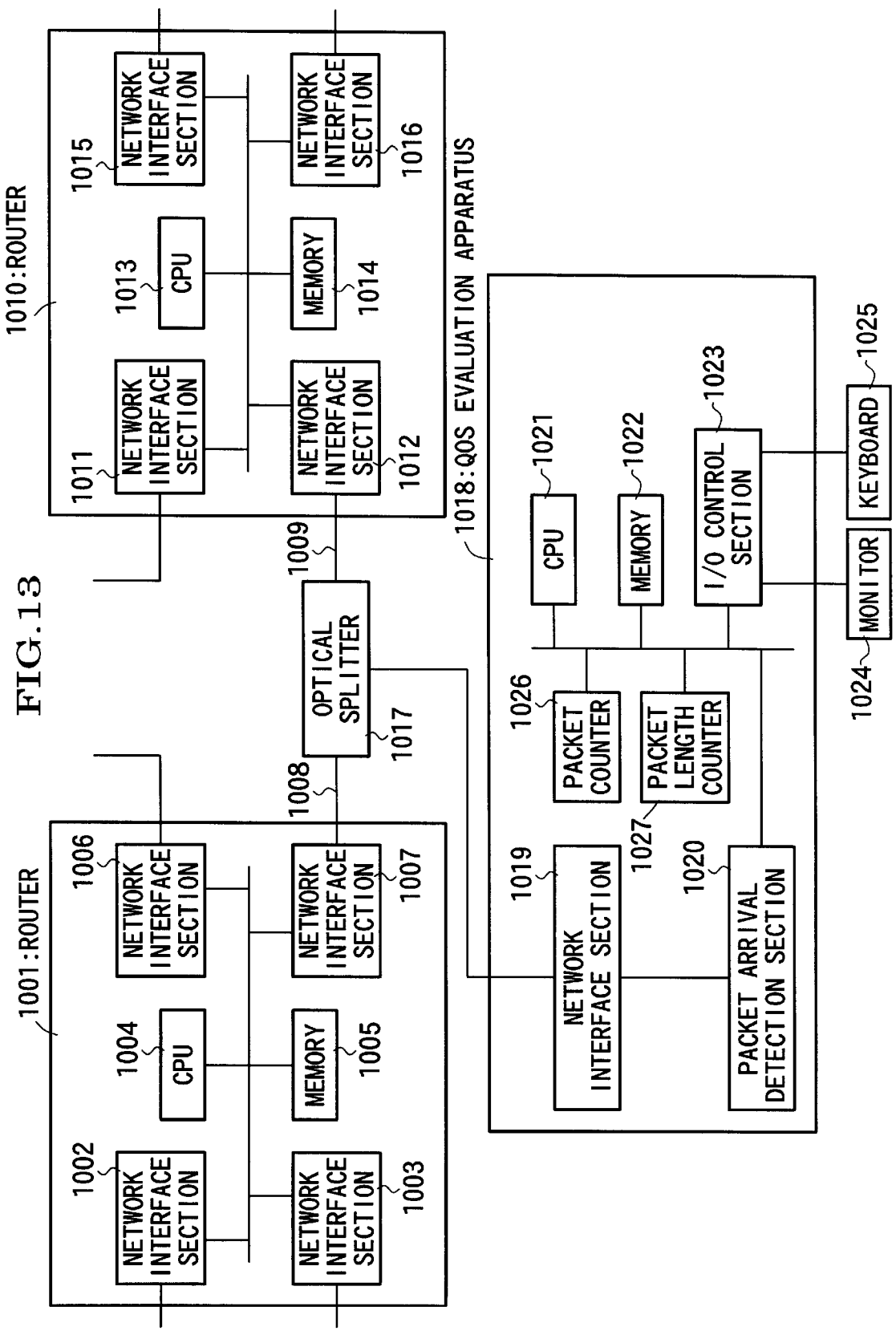
FIG. 13 is a block diagram of the configuration of the essential parts in a third embodiment of QoS evaluation apparatus.

The third embodiment relates to another QoS evaluation apparatus 1018 whose essential parts are indicated in a block diagram shown in FIG. 13. The apparatus evaluates the quality of data traffic in the lines 1008, 1009 connecting the routers 1001, 1010. A router 1001, having network interface sections 1002, 1003, 1006, 1007 to provide low level layer processing as the circuit termination point, packet buffering and data transfer processing, follows the routing table in memory 1005 to transfer packets input from each network interface section through corresponding network interface sections to data transmission lines. The routing table in the memory 1005 can be changed as necessary by CPU 1004, according to control information and routing protocol. When the available buffer is not sufficient for the line speed of the lines 1008, 1009 and network interface sections, delay may be caused by congestion in the output network interface section and packet loss may be caused by buffer overflow.

An optical splitter 1017 is inserted between desired lines 1008, 1009, and the packets are duplicated and monitored electronically or optically. Monitored packets receive a low level layer processing in the network interface section 1019, and are forwarded to a packet arrival detection section 1020. In the packet arrival detection section 1020, payload is removed and header information other than the packet length information written in a certain location (depending on the packet format) is removed and a timestamp in attached. Packet length information and timestamp thus obtained for each packet are read out by CPU 1021. Using this information, CPU 1021 performs quality evaluation of the traffic in the lines 1008, 1009. In preparation for the evaluation process, initialization steps shown in FIG. 5 are performed. Explanations are omitted because the drawing applies to this case by simply replacing cells with packets.

Figure 14:
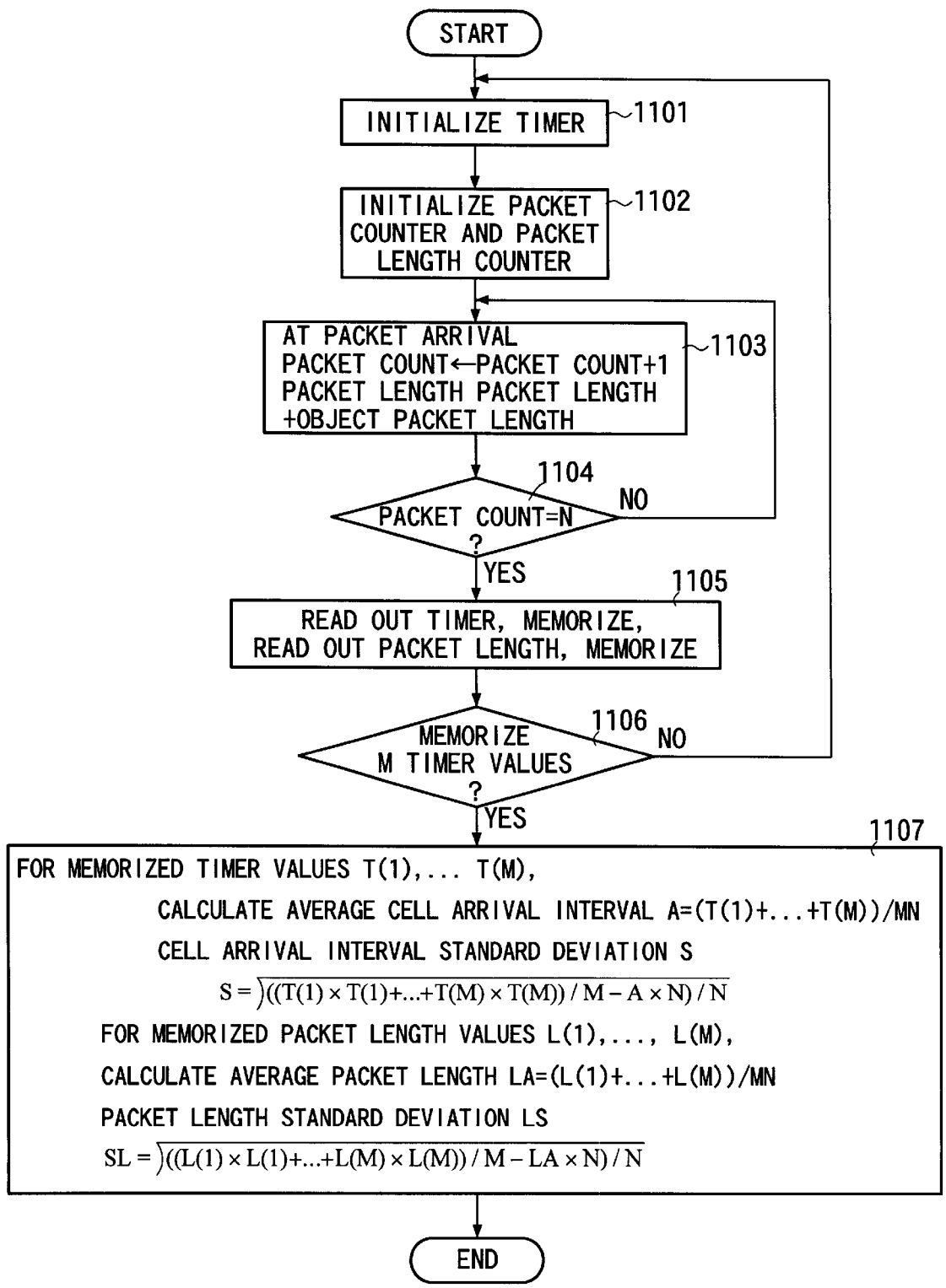
FIG. 14 is a flowchart showing a process of obtaining statistical details for the purpose of generating added traffic.

FIG. 14 shows the process of obtaining statistical details for generating additional traffic. First, CPU 1021 resets a timer and a packet counter 1026, a packet length counter 1027 (1101, 1102). When CPU 1021 finds a new packet arriving in the packet arrival detection section 1020, CPU 1021 increments the value of the packet counter 1026 by "1" and the value of the packet length counter 1027 is increased by the amount of packet length data found in the packet arrival detection section 1020 (1103). When the packet count reaches N (1104), CPU 1021 reads out the timer value and the value of the packet length counter, and stores this information in apparatus memory 1022 (1105). When M timer values (and packet length counter values) are obtained (1106), CPU 1021 calculates average packet arrival interval A, standard deviation S for packet arrival intervals, average packet length LA and its standard deviation LS from the timer values and packet length counter values stored in apparatus memory 1022 (1107).

Figure 15:
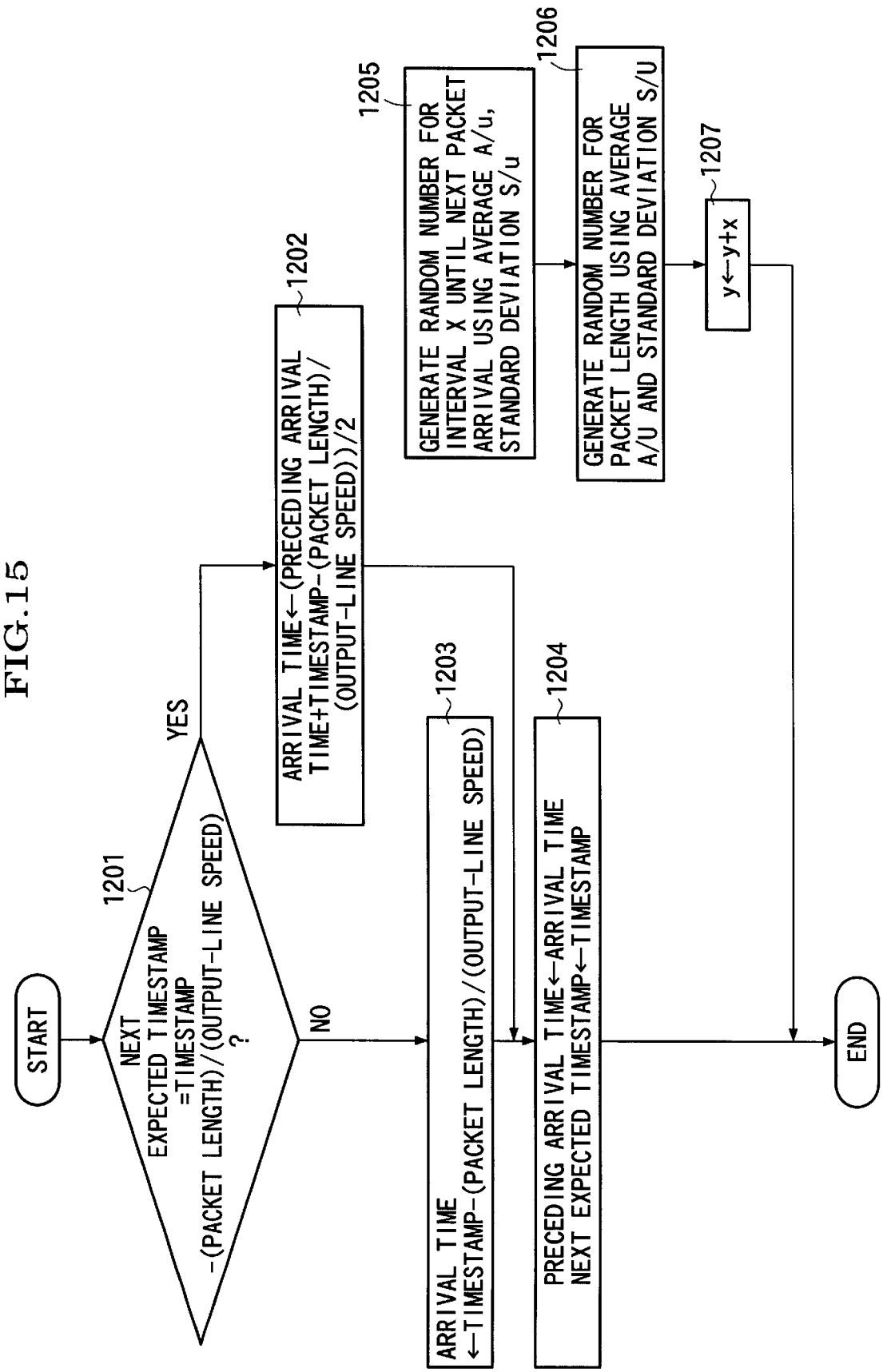
FIG. 15 is a flowchart of a process for CPU to estimate the packet arrival times.

In evaluating the quality of service by reproducing the traffic in lines 1008, 1009 and simulating the system 1001, it is necessary for CPU 1021 (estimation section) to estimate the packet arrival times from the timestamps and packet length information obtained from the packet arrival detection section 1020. One method is shown in FIG. 15. Another simple method of estimating the arrival time is to directly use the values obtained from a relation [timestamp−(packet length)/(output-line speed)], but the precision of this method is inferior when the traffic becomes very heavy.

CPU 1021 compares the next expected timestamp with the calculated result of [timestamp−(packet length)/(output-line speed)] obtained from the latest timestamp and packet length data obtained from the packet arrival detection section 1020 (1201). If the two values agree, it means that packets are found in the buffer, therefore, estimated packet arrival time of the object packet is chosen as a mid-point between the estimated arrival time of the preceding packet and the value obtained from the relation [timestamp–(packet length)/(output-line speed)] (1202). In practice, a predetermined level of fluctuation is allowed. If the two values do not agree, packets do not wait for transmission in the buffer, Thus, the estimated arrival time can be calculated from the relation [timestamp–(packet length)/(output-line speed)] (1203). Next, [preceding arrival time] and [next expected timestamp] are renewed (1204). Additional traffic is generated, as in the first embodiment, by using random numbers according to statistical details shown in FIG. 14 (1205), Packet length of additional traffic is also determined as shown in FIG. 14 (1206). The arrival time y of the additional traffic is updated (1207).

Figure 16:
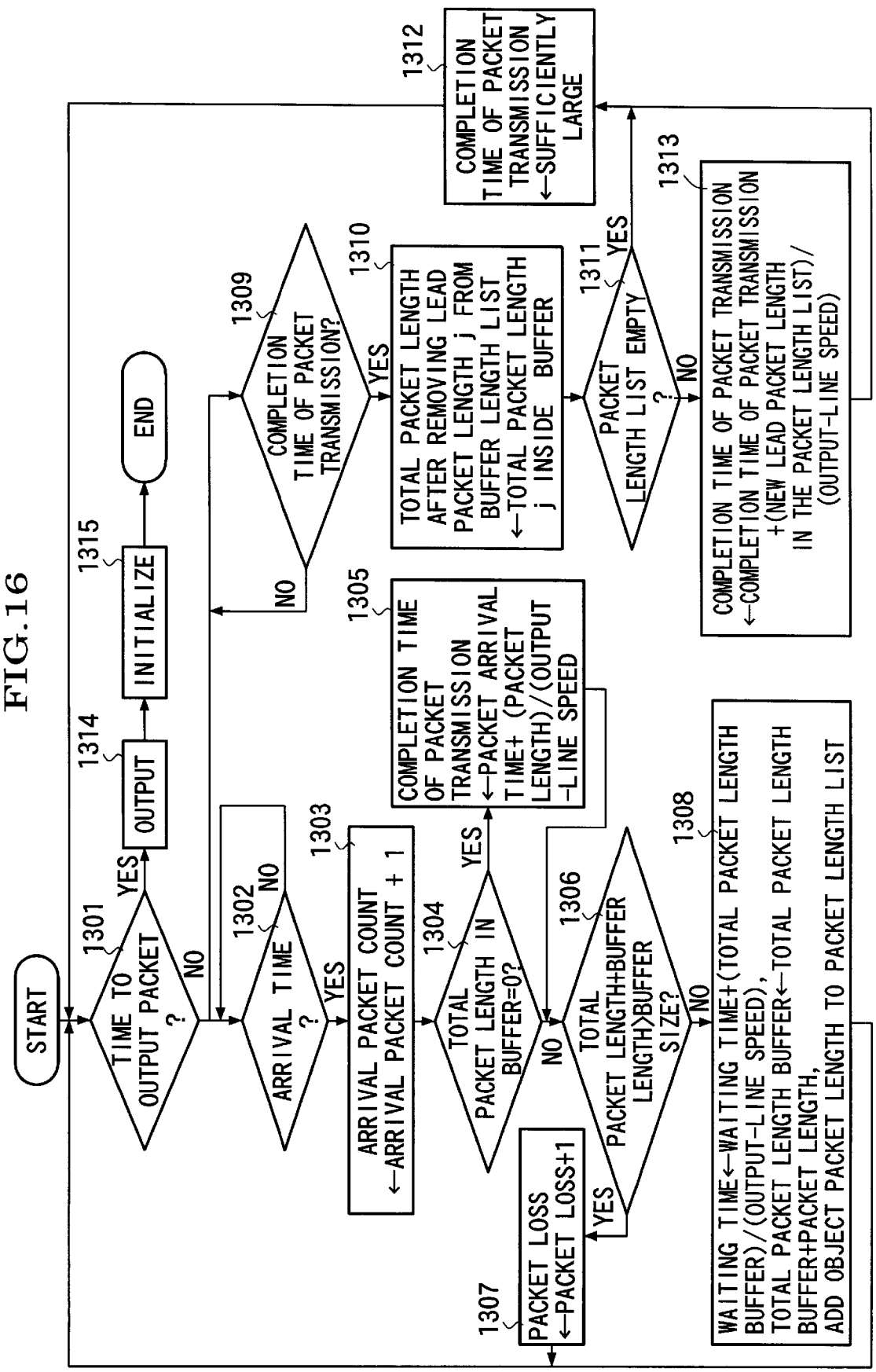
FIG. 16 is a flowchart of a process for CPU to perform QoS evaluation by simulation.

A method shown in FIG. 16 is for evaluating the quality of service through a simulation by CPU 1021 (simulation section), based on information in every packet received, such as estimated arrival times and packet length. The following explanation assumes that the FIFO discipline is used. Other disciplines can also easily be, accommodated.

When a packet arrival time obtained in FIG. 15 is reached (1302), the arrival packet counter is incremented by "1" (1303). At this point, if there is no packet in the buffer in the simulation (1304), next completion time of packet transmission is obtained from the relation [timestamp–(packet length)/(output-line speed)], which is the completion time of transmission of the currently arrived packet (1305). It is then determined if the buffer may overflow because of the currently arrived packet. If the buffer overflows (1306), packet loss counter is incremented by "1" (1307). If there is no overflow (1306), [(total packet length in buffer)/(output-line speed)], which is the waiting time for the object packet, is added to the cumulative value of waiting times, and the object packet length is added to the total packet length, and the object packet length is entered in the list of packet lengths (1308). When the completion time of packet transmission is related (1309), the first packet length j in the list of packet lengths is removed, which is equal to the length of the packet that completes transmission, and the total packet length in the buffer is decremented by the amount corresponding to the object packet length (1310). If the buffer becomes idle as a result (1311), a sufficiently large value is given to the next completion time of packet transmission (1312). This value is renewed by the arrival of the next packet. If the packet length list does not become vacant, the packet transmission completion time is derived to assume that the packet is transmitted continuously from the preceding packet transmission completion time, and is selected as the next completion time of packet transmission (1313). When a certain output time is reached (1301), accumulated values of the arrival packet count, waiting time and packet loss are output, through the I/O control, section 1023, to the monitor 1024 (1314). As necessary, [packet loss ratio= packet loss count/arrival packet count], [average waiting time=waiting time/(arrival packet count-packet loss count)] are calculated and the results are output, then the arrival packet count, packet loss count and waiting time are reset (1315).

In the third embodiment, the processes shown in FIGS. 5, 14, 15 and 16 are performed by having CPU 1021 executing a suitable computer-executable program (not shown). Also, it is necessary for the packet arrival detection section 1020 to perform at high speeds, so that a dedicated hardware should be used. However, if the processing speed of CPU 1021 is sufficiently high, CPU 1021 may execute the program to provide the functions of packet arrival detection section 1021.

In the quality evaluation apparatuses presented in the first to third embodiments, timestamp data of cells or packets are obtained directly by inserting an optical splitter. For this reason, there is no loss of information caused by measured items in ATM switching systems exchangers or routers. Also, cell or packet arrival times are estimated from the respective timestamps of each cell or packet, and are given to a simulation model as a direct feed data. For this reason, information loss and modeling errors, produced by summarizing the parameters into a limited number of statistical grouping, are not caused. Analyses are performed by near real-time simulation, not be numerical equations, so that the analytical precision is high.

As explained above, the present invention enables high precision evaluation of the quality of service without the loss of traffic information, and without being affected by modeling errors, and furthermore, without the use of numerical equations.

Next, the invention relating to a method of measuring data traffic will be presented in the following.

An embodiment of the traffic measurement technique will be presented with reference to the drawings. In this embodiment, ATM network traffic measurements will be described, but it is evident that the technique is equally applicable to packet networks. First, the invention will be briefly summarized. In general, individual protocol layers encountered in communication traffic are structured such that headers and trailers are given in the upper layer and are passed down to the lower layers. In the present invention, this feature of the structure is utilized so that measurements can be performed in any layer under similar measurement conditions and operational rules to derive an integrated "application programming interface" (API). The use of such an API enables to present a method that is flexible and ideally suited to such measurements dealing with multimedia traffic requiring monitoring of information traffic in a multi-layered structure.

Figure 17:
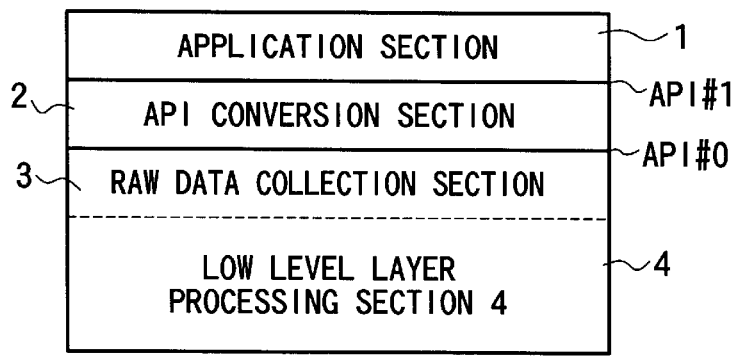
FIG. 17 is a schematic diagram of a traffic measuring apparatus to perform traffic measurements according to the method.

A layer configuration of the traffic measuring apparatus is shown in FIG. 17. Application 1 produces the desired measurement items by manipulating the raw data of traffic measurements output by raw data collection section 3. Application 1 performs a process, for example, [obtain a total sum of cells carried in a VP (virtual path) of VPI (virtual path identifier)=32], referred to as Example 1 below. Or, in example 2, a process may be [determine a frequency distribution of IP packet lengths at every 100 bytes to a maximum of 32 k bytes, using AAL5/LLC-SNAP encapsulation for each sender IP address sent in IPv4] where an AAL5/LLC-SNAP encapsulation refers to a logic step, (ATM adaptation layer/logical link control)–(subnetwork access point), and IPv4 refers to Internet Protocol version 4.

Figure 18:
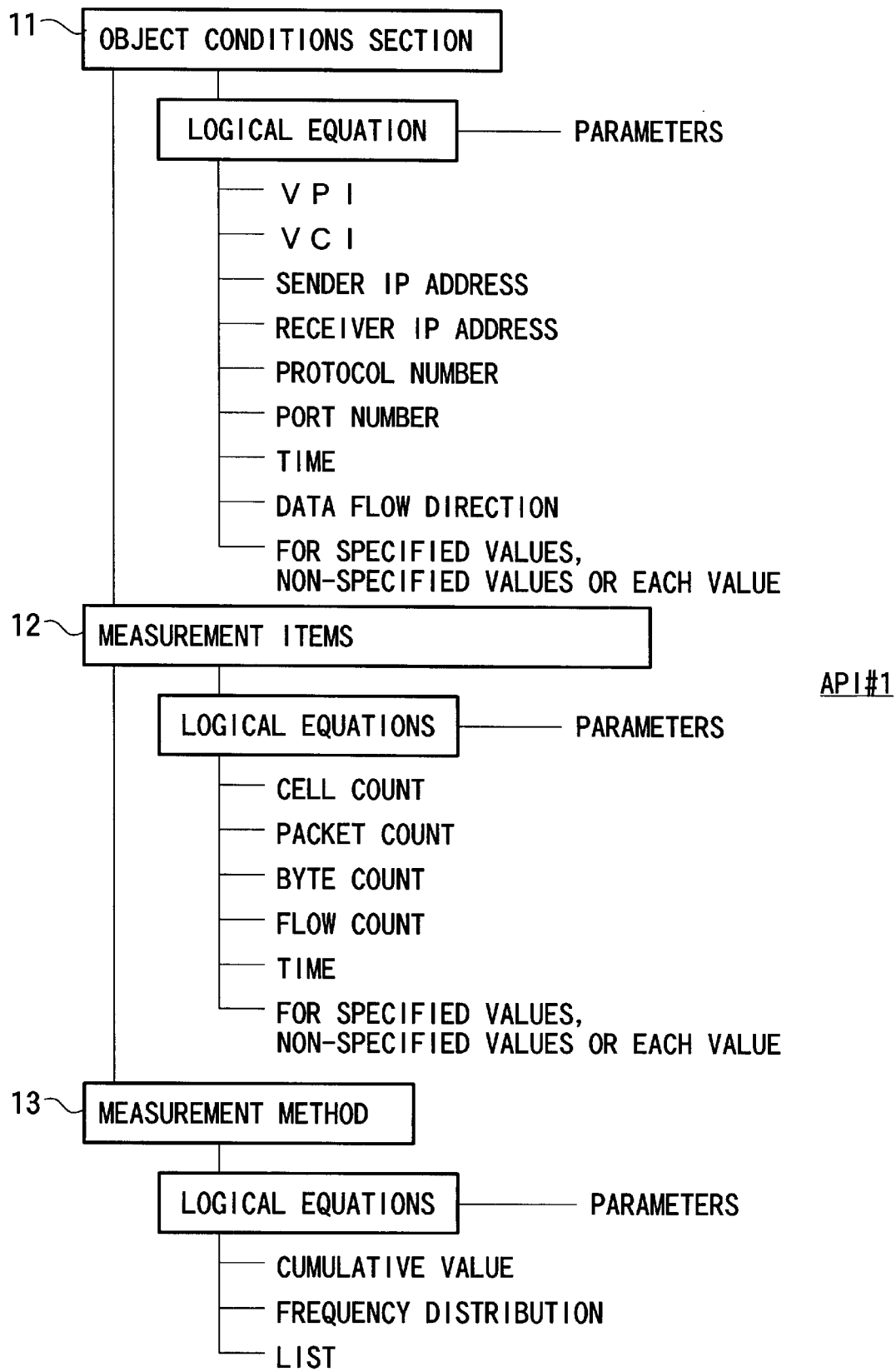
FIG. 18 is a schematic diagram of the structure of API#1 in the traffic measuring apparatus.

API#1 is easy for application 1 to process, and acts as a user-friendly interface to application 1, and is comprised by object conditions section 11, measurement items 12 and measurement method 13, as shown in FIG. 18. This API#1 occupies a higher level than API#0 which will be described later.

The object conditions section 11, in terms of the Examples 1 and 2 presented above, relate to [VPI] and [sender IP address by AAL5/LLC-SNAP encapsulation in IPv4 protocol]. Other measurement objects in object conditions section 11 include [VCI], [receiver IP address], [protocol number], [port number] ([sender port number], [receiver port number]). These object conditions may be further restricted by conditions such as AAL5/LLC-SNAP encapsulation in IPv4 protocol given in Example 1. Measurement item 12 includes [cell count], [IP packet length] relating to Examples 1 and 2, but may also include [(IP) packet count], ⌈number of carried packets/cells⌋ and, although not indicated in the drawing ⌈flow duration⌋. Measurement methods 13 include such quantities as ⌈total sum⌋ (cumulative value in the drawing) and ⌈frequency distribution (for every 100 bytes)⌋. Also, conversion processes such as frequency distribution into probability distribution are performed by application 1 as necessary. Also, measurement methods 13 may specify some measurement time band.

In practice, this means that representative programs such as the object conditions section 11, measurement items 12 and measurement methods 13 will be prepared for API#1. Application 1 defines objects to be measured in the object conditions section 11, by specifying specific values, ranges or ⌈for each value of⌋, which are indicated by "each" in the drawing, or specifying a combination based on logic equations. Also, application 1 specifies measurement items 12 and measurement methods 13, normally by raising a flag for a particular item in a prepared list.

Figure 19:
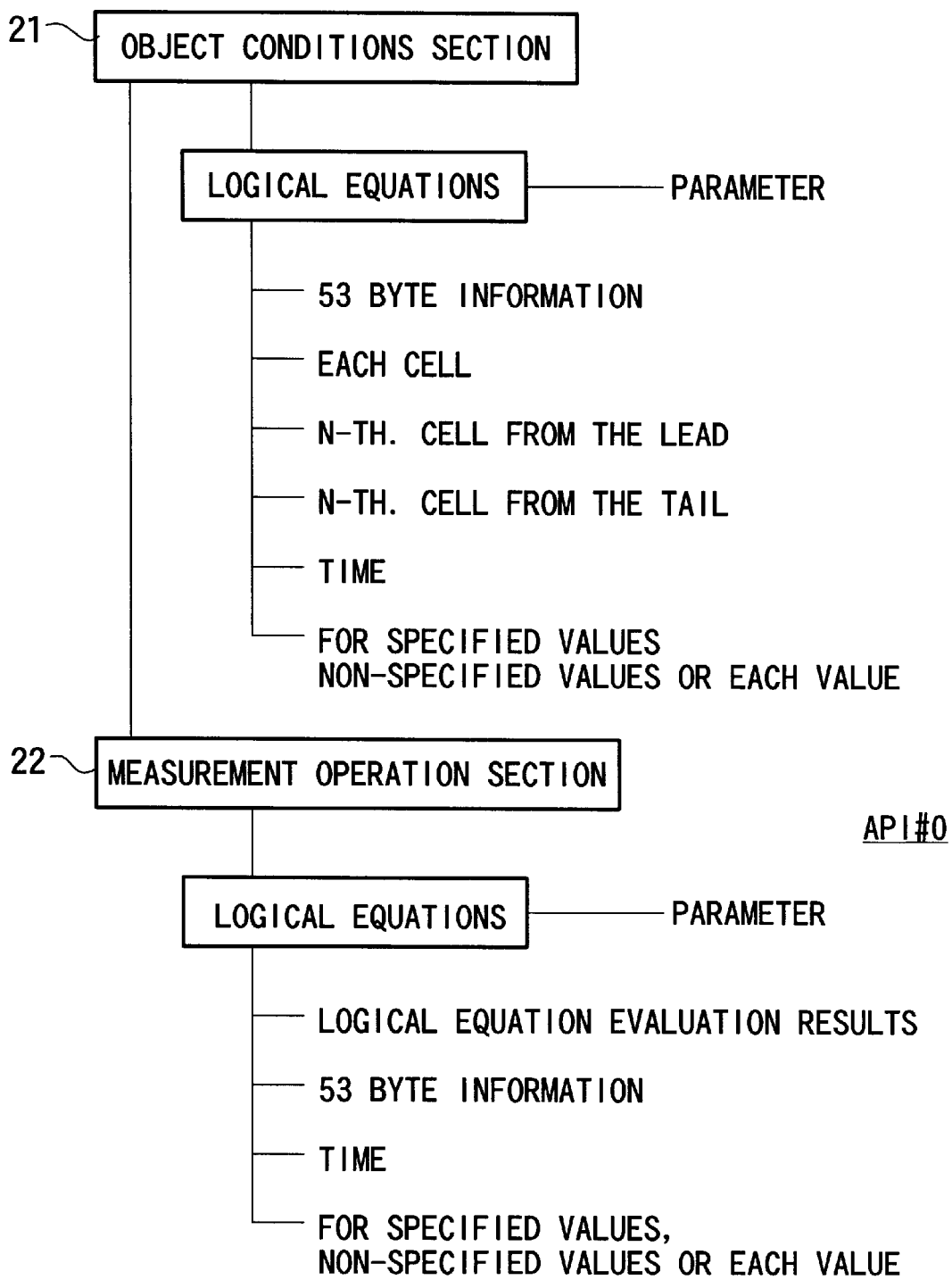
FIG. 19 is a schematic diagram of the structure of API#0 in the traffic measuring apparatus.

Next, API#0 will be explained. API#0 is a general purpose measurement program obtained by converting API#1 so as to facilitate collection of raw data. The API conversion section 2 performs conversion of API#1, which is readily understood by application 1, to API#0. The structure of API#0 will be explained with reference to FIG. 19. As shown in FIG. 19, API#0 is comprised by an object conditions section 21 and a measurement operation section 22. The object conditions section 21 describes a measurement condition in a format using m, n as parameters, such as ⌈time information and/or logic equations to be satisfied by (m)th~(n)th bits|inside a cell (53 bytes).

Figure 20:
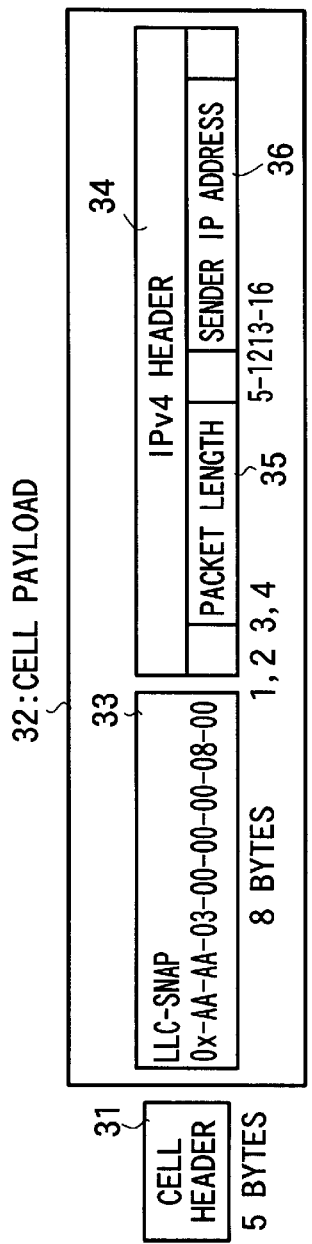
FIG. 20 is a schematic diagram of an example of the structure of an ATM cell observed in traffic measurement.

For example, in Example 1, because VPIs are assigned to 2nd~3rd bytes in a cell, a measurement condition ⌈VPI=32⌋ means a conversion of ⌈5th~12th bits to 32⌋. Also, in Example 2, ⌈AAL5/LLC-SNAP encapsulation in IPv4 protocol⌋ means that the cell structure for transferring the IP protocol data unit is as is shown in FIG. 20, therefore, the conversion is ⌈6th~13th bytes are 0xAA-AA-03-00-00-00-08-00⌋ (0x indicates a hexadecimal number). The converted data are passed to the raw data collection section 3 through API#0. Also, supplemental information for FIG. 20 is that each cell is comprised by a cell header 31 and a cell payload 32. Also, a cell payload 32 is comprised by LLC-SNAP header 33 and an IPv4 header 34, which includes packet length data 35 and a sender IP address 36.

In the case of Example 2 described above, it is necessary to detect the first cell comprising an IP packet, but in such a case, measurement conditions which cannot be decided within a cell must be passed onto API#0. To achieve this, API#0 uses n as a parameter and presents a specifying method such as ⌈each cell⌋, ⌈nth cell from the first cell⌋, ⌈nth cell from the tail cell⌋. Incidently, instead of such specifying methods, an API may be pre-programmed in API#1.

Next, in the measurement operation section 22, API conversion section 2 converts cell information to the form described below, in accordance with object conditions section 11, measurement items 12 and measurement methods 13. That is, using k, m and n as parameters, conversion in the measurement operation section 22 is ⌈based on time information and/or (m)th~(n)th bits (or bytes) inside the measurement object conditions cell and the evaluation value of a (k)th order logical equation using the current values of an array of size k, either add each array element of size k or append link each array element using a list⌋.

In Example 1, the measurement operation section 22 in response to ⌈a total sum of cells carried in VP of VPI=32⌋ increments the cell count by ⌈addition of 1⌋ for each detection of a cell satisfying the measurement conditions. Therefore, the logic equation in this case is first-order and k=1 in this case. Because data inside the object condition cell are not used, m and n can assume any value. In the meantime, in IPv4 header 34 in Example 2, information for packet length 35 is assigned to $3^{rd}$~$4^{th}$ bytes, and the sender IP address 36 is assigned to the $13^{th}$~$16^{th}$ bytes. Therefore, the response of the measurement operation section 22 corresponding to ⌈IP packet length frequency distribution at every 100 bytes to a maximum of 32 k bytes, using AAL5/LLC-SNAP encapsulation for each sender address in the IPv4⌋ is as follows. That is ⌈applend the content of $26^t$~$29^{th}$ bytes to the element at min (1+integer portion of [x/100], 320) in an array where x is the value in the region $16^{th}$~$17^{th}$ bytes⌋ and "min" is a function to select the smallest.

In other words, corresponding to measurements of packet length for every 100 bytes and restricting the maximum value of the packet length to 32 k bytes, the measurements are taken so that the results of min (1+integer portion, [x/100],320) will range from "1"~"320". An array of "320" size is prepared, and for each number in the range, an element is assigned. The element has a link of sender IP addresses 36 extracted from the user data cells. In this case, the parameters are k=320 to indicate the size of the array, and m and n are assigned to $16^{th}$~$17^{th}$ and all the bytes between $26^{th}$~$29^{th}$ bytes in each cell, so that m=16 and n=29.

Figure 21:
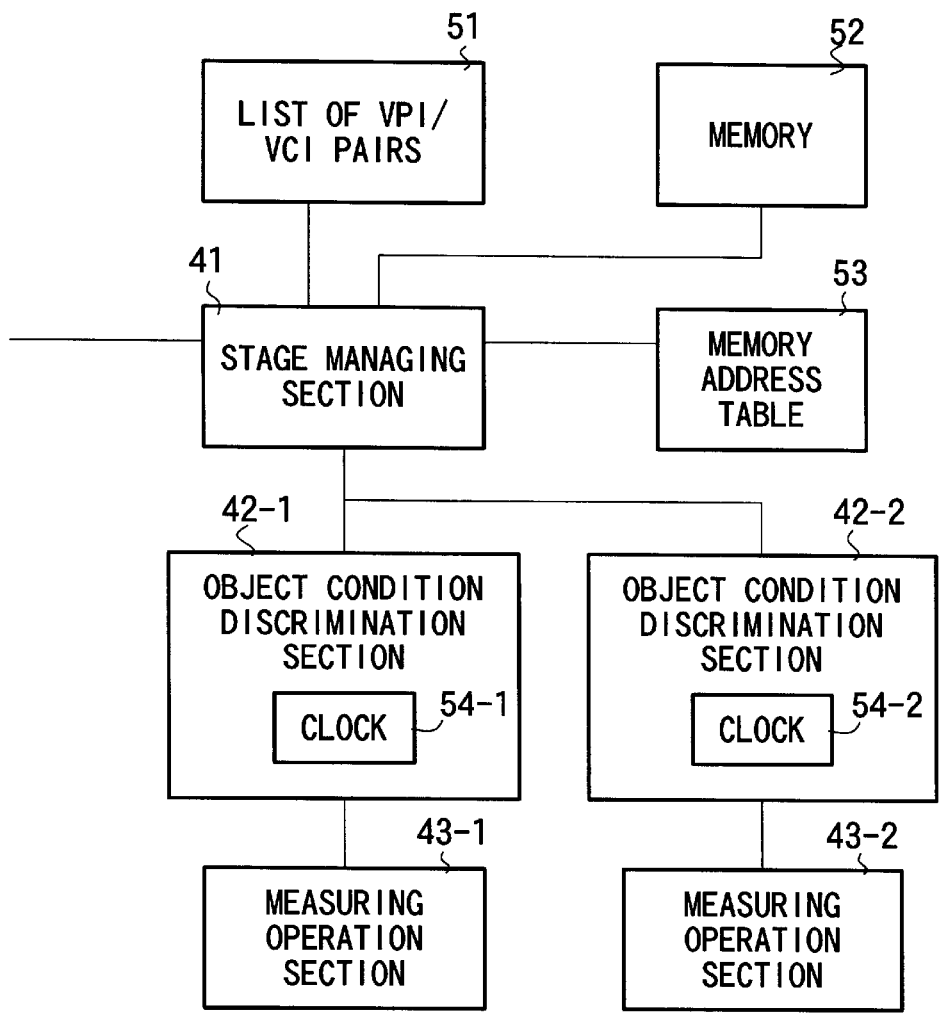
FIG. 21 is a block diagram of the structure of a raw data collection section 3 used in the traffic measuring apparatus.

The raw data collection section 3 is comprised by a state managing section 41, a plurality of object condition discrimination sections 42-1, 42-2, . . . , and a plurality of corresponding measuring operation sections 43-1, 42-2, . . . , as shown in FIG. 21. In general, there are a number of object condition discrimination sections and measuring operation sections, but only two are shown for each section in the drawing for simplicity. The raw data collection section 3 collects data according to the contents specified by the rules given by API#0, and manages the states of the cells over several cells (for example ⌈detection of (n)th cell from the first cell⌋).

That is, the state managing section 41 in the raw data collection section 3 does not manage the states when ⌈each cell⌋ is specified in the object conditions section 21. On the other hand, if ⌈(n)th cell from the first cell⌋ is specified in the conditions section 21, the state managing section 41 prepares a counter for each VPI/VCI to count the number of arriving cells. Then, the state managing section 41 checks PTI (payload type identifier) region contained in the header 31, and identifies the last cell using "000" or "010" (binary number in both cases) in the relevant region, and sets the counter values for the VPI/VCI to "0". Hereafter, the state managing section 41 adds "1" to the value in the counter when the last cell of the user data having the same VPI/VCI arrives. When the last cell of the user cell arrives again, the value of the counter is set to "0". By following such steps, position of each cell from the fist cell can be identified so that the state managing section 41 compares the value of "n" indicating the ⌈(n)th cell from the first cell⌋ notified by API#0 with the count value in the cell counter, and if the cell meets the conditions, then the cell is passed to the object condition discrimination sections 42-1, 42-2.

If, on the other hand, ⌈(n)th cell from the tail cell⌋ is specified, the state managing section 41 uses a VPI/VCI list 51 for performing processes related to the ⌈(n)th cell⌋, an apparatus memory 52 storing the cell and a memory address table 53 shown in FIG. 23. When the cell arrives, if the VPI/VCI of the cell is contained in the VPI/VCI list 51, the state managing section 41 refers to the memory address table 53. On the other hand, if the arrived cell is not contained in the VPI/VCI list 51, because the cell is the first cell, the stage managing section 41 stores the cell in the apparatus memory 52, and the address of the cell in the memory 52 and the values of VPI/VCI are recorded in memory address table 53. At this time, the value of the cell counter is initialized to "1".

Same processing is carried out for the cells that follow, and the state managing section 41 increments the value of cell counter by "1" while holding the cells in the apparatus memory 52 and entering addresses of the memory 52 with the cells together with the value of VPI/VCI in the memory address table 53. After this step, upon detecting the last cell as described above, the state managing section 41 identifies the address of (n)th. cell from the last cell from the content of the memory address table 53, and fetches the cell from the apparatus memory 52, based on the identified address, and passes it to object condition discrimination section 42-1, 42-2. Next, the state managing section 41 deletes the VPI/VCI related cells held in the memory 52 and the entries in the memory address table 53.

Next, the measurement object condition discrimination section 42-1 reads the time from an internal clock 54-1, and judges whether the current cell matches the time value and the condition of the object conditions section 21 of the API#0 found in the input cell. The object condition discrimination section 42-1 then inputs the cell judged to be the object cell in its corresponding measuring operation section 43-1 together with the time information. In the meantime, as described earlier, an array of k number of elements corresponding to the descriptions in the API#0 is stored in the measuring operation section 43-1. The measuring operation section 43-1 renews the content of the array, based on the time information and the object cell and the content of the corresponding array element, according to operational rules. The functions of the object condition discrimination section 42-2 and measuring operation section 43-2 are the same as those of the object condition discrimination section 42-1 and the measuring operation section 43-1.

Next, the low layer processing section 4 shown in FIG. 17 performs removal of cells from a SDH frame (synchronous digital hierarchy) and error correction for cell headers using HEC (header error control). Here, by undergoing processing in the low layer processing section 4, the cells are sent to the raw data collection section 3 as data units in the ATM layer. Operation of the ATM layer will be explained in more detail below.

Figure 24:
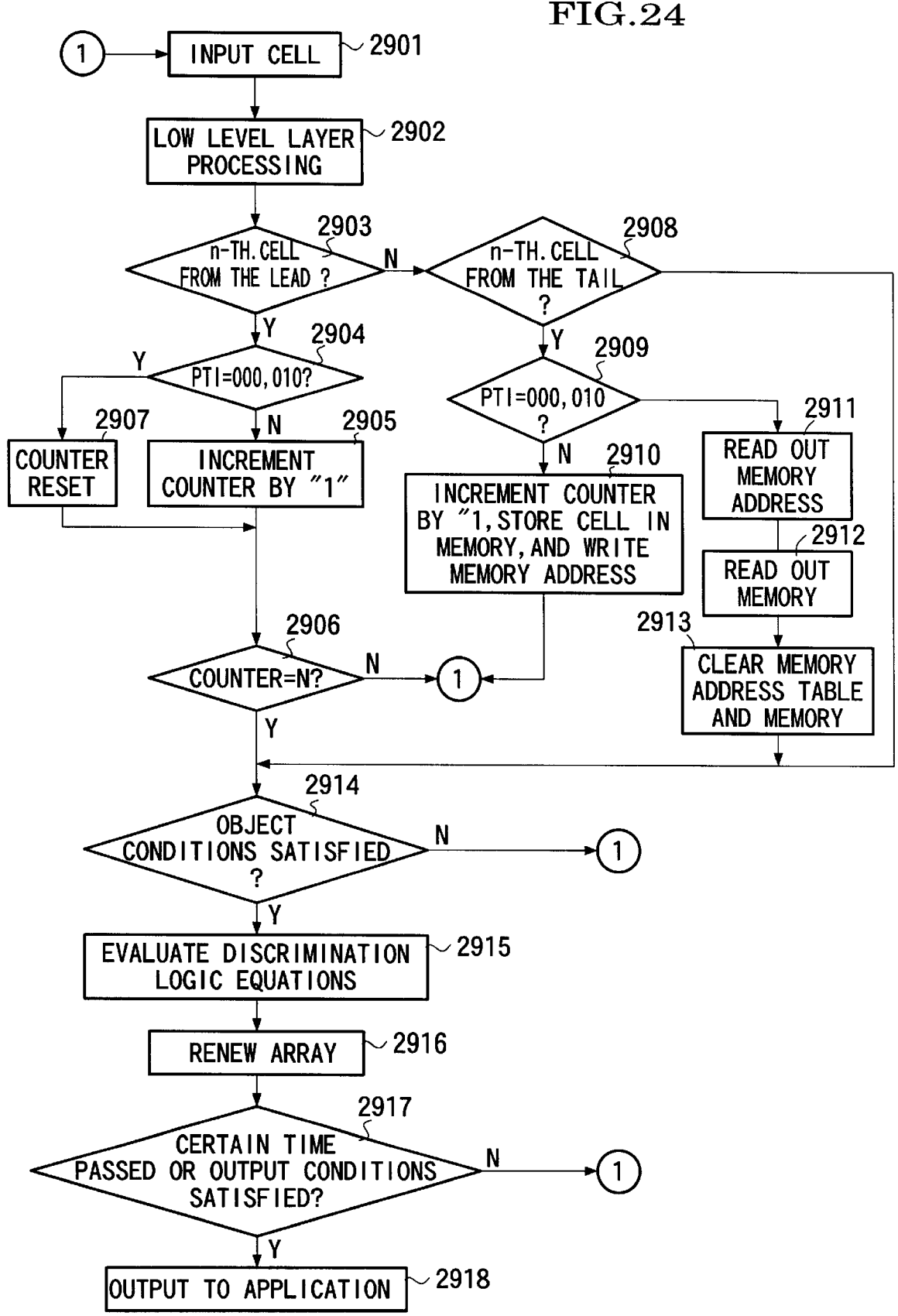
FIG. 24 is a flowchart showing the operation of the traffic measuring apparatus.

Next, with reference to the flowchart in FIG. 24, processing in the measuring apparatus will be explained by following the flow of cells in an example of the structure of the ATM networks shown by the block diagram in FIG. 25. As shown in the diagram, end systems 2801, 2802 and end systems 2803, 2804 are connected to the respective ATM switching system 2805 and 2806. An optical splitter 2807 is provided to branch off from the switching system so as to perform traffic measurements in the ATM networks using a traffic measuring apparatus 2808.

Figure 25:
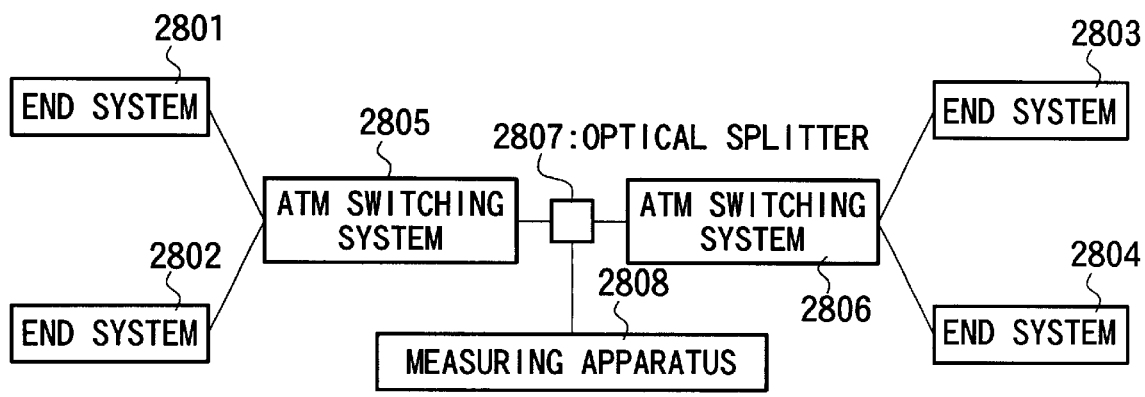
FIG. 25 is a block diagram of an example of the structure of ATM networks evaluated by the traffic measuring apparatus.

In the ATM networks shown in FIG. 25, the optical splitter 2807 branches off the traffic (cells) between the ATM switching system 2805, 2806 and directs them to the traffic measuring apparatus 2808 (2901). In the apparatus 2808, the low layer processing section 4 first performs such tasks as taking out cells from the SDH frame and error correction using HEC and sends the cells to the state managing section 41 in the raw data collection section 3 (2902). Next, the state managing section 41 checks VPI/VCI, and judges successively whether the object cell meets the conditions of ⌈(n)th cell from the first⌋ or ⌈(n)th cell from the tail⌋ (2903, 2908, respectively).

If the object cell meets the condition of ⌈(n)th cell from the first⌋ (yes in 2903), the state managing section 41 checks whether any of the arriving user data cells is the last cell (2904). When PTI="000" or "010" is detected the object cell is the last cell (yes in 2904), so the state managing section 41 resets the value of the counter for the relevant VPI/VCI, in the table shown in FIG. 22, to "0" (2907).

On the other hand, if the object cell is not the last cell (no in 2904), the state managing section 41 adds "1" to the counter for the object VPI/VCI in the table shown in FIG. 22 (2905). Next, the state managing section 41 compares the value of the counter and the parameter n (2906), and if the counter value does not match the parameter n (no in 2906), returns the process to step 2901 to repeat the process described above. When the value of the counter matches with the parameter n (yes in 2906), then the object cell is input into the condition discrimination sections 42-1, 42-2.

In the meantime, if the object cell is judged to be ⌈(n)th cell from the tail⌋ (yes in 2908), the state managing section 41 judges whether the object cell is the last cell by following the same procedure as above (2909). If it is not the last cell (no in 2909), the state managing section 41 adds "1" to the counter in the memory address table 53 (note that an initial entry of the counter for the object VPI/VCI is "1") to prepare a new entry and stores the object cell in the apparatus memory 52 while entering the address of the cell, stored in the memory 52, in the prepared entry, and returns the process to step 2901 (2910).

After which, when the last cell is detected according to PTI="000" or "010" (yes in 2909), the stage managing section 41 checks an address for the (n)th cell preceding the tail (2911) to read the object cell held in the relevant address in the apparatus memory 52, and inputs it in the object condition discrimination sections 42-1, 42-2 (2912). Next, the state managing section 41 deletes the lines containing the object VPI/VCI from the memory address 53 as well as the object cell belonging to the deleted addresses from the apparatus memory 52 (2913).

On the other hand, if the object cell does not match either the ⌈(n)th cell from the first⌋ or ⌈(n)th cell from the tail⌋ (no in 2908), then the state managing section 41 inputs the object cell, as is, in the object condition discrimination sections 42-1, 42-2, which judge whether the object cell satisfies the conditions specified in the object conditions section 21 (2914). Here, the object conditions are given by API#0 forwarded from API conversion section 2, according to logic equations comprised by time information and/or 53 bytes concerning the object cell.

When it is found that these conditions are satisfied (yes in 2914), the condition discrimination sections 42-1, 42-2 transfer the object cell and time information to respective measuring operation sections 43-1, 43-2. Each of the measuring operation sections 43-1, 43-2 has a measurement operation section 22 (refer to FIG. 19), which is an array of a size k to be determined when the operation is specified by API#0. Therefore, each of the measuring operation sections 43-1, 43-2 evaluates (2915) the values of k-order logic equations (brought by API#0) according to the time information and/or 53 bytes of information of the received cell (using only a part of the information determined by parameters m, n) and the current values held in the k-sized array. This evaluation process determines whether the result is added to the k-sized array or attached as a list (2916).

Next, each of the measuring operation section 43-1, 43-2 judges whether a certain time interval has passed, or output conditions specified by API#0, API#1 are satisfied (2917). If the conditions are not satisfied (no in 2917), the process is returned to step 2901. On the other hand, if the conditions are satisfied (yes in 2917), then each of the measuring operation sections 43-1, 43-2 passes the k-order array to application 1 (2918).

If the conditions specified in the object conditions section 21 are not satisfied (no in 2914), then the process is returned to step 2901 to reiterate the process described above.

As described above, in the present embodiment of the traffic measuring apparatus, the general purpose API performs far more than the traditional roles and functions such as labeling of addresses and addressing functions in each protocol layer. By combining the parameters through logic equations, the API can prescribe: discrimination and selection of measurement objects; measurement conditions including selection of measurement items and methods within each protocol layer, using protocol data units and service units; and measuring operations according to these measurement conditions. Also, measuring operations are determined by logic equations based on the content of registers (array) which are holding the measurement results from preceding operation, measurement objects themselves such as cell and packet and time. The use of such an API in the present traffic measuring apparatus contributes significantly to providing a flexible method of customizing the measurement conditions so as to accommodate a variety of cases of traffic activities.

In this embodiment, data units that have passed through the processes in the low level processing layer 4 are checked for whether or not the object conditions specified by the API are satisfied, but such discrimination processing is generally carried out, in effect, for data units that have passed protocol processing in a lower layer adjacent to the attention protocol layer.

As explained above, in the present method of traffic measurements, processing of SDH frames or HEC processing, of ATM headers in the packet or ATM networks are performed first, and only those units that have been through these processes are judged for their satisfying of measurement conditions specified by the API. Those units that have satisfied the measurement conditions are subjected to measuring operations specified by the API. Raw data obtained by measuring operations are manipulated to compute the targeted measurement contents. By following such a methodology, one measurement apparatus is sufficient to perform traffic measurements for a variety of communication modes in a most flexible manner to provide customized items of traffic activities.

Figure 6:
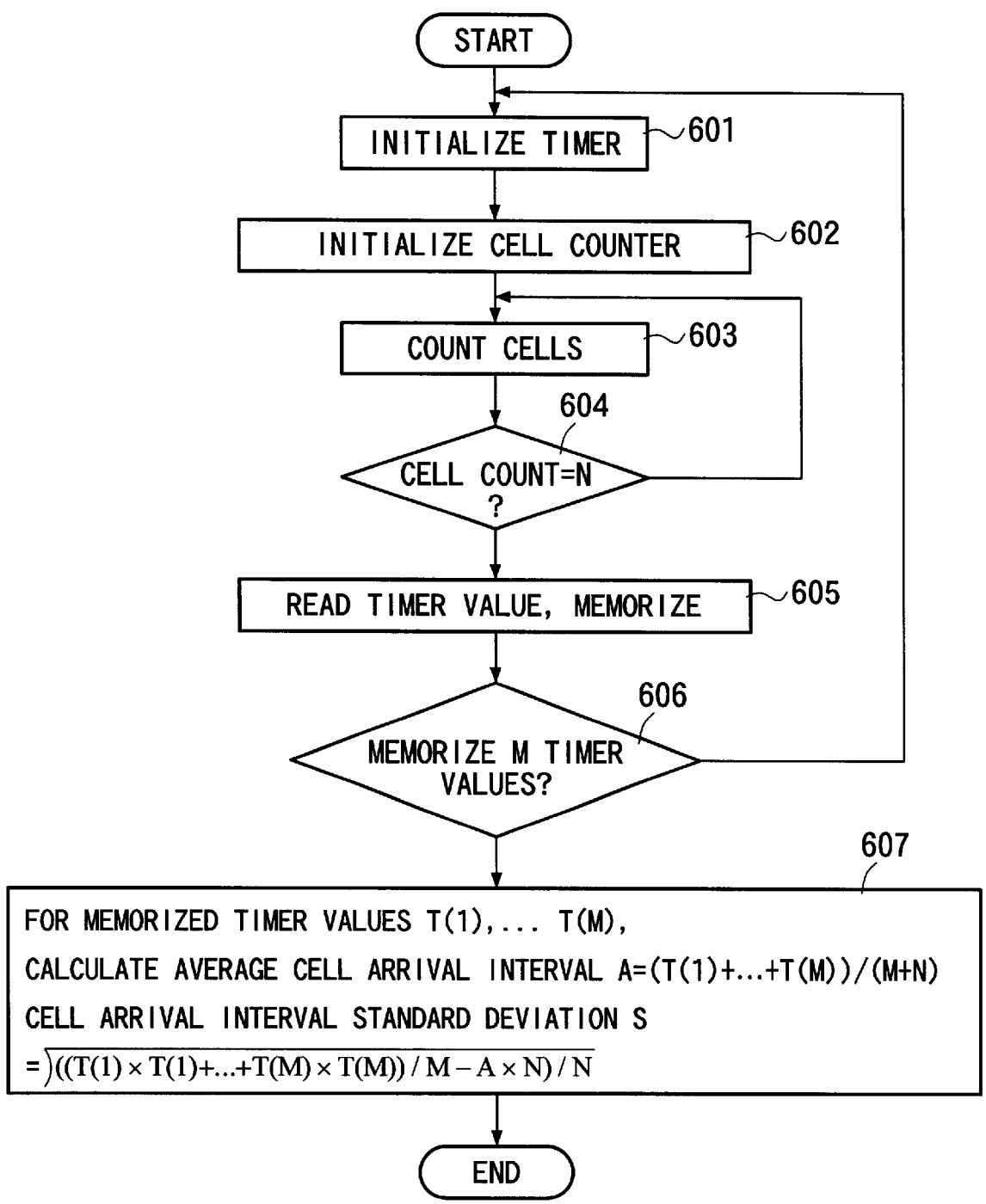
FIG. 6 is a flowchart for a process of obtaining statistical details for generating added traffic.

Further, it is permissible to perform a QoS evaluation by loading executable programs into a computer and executing the programs for various functions assigned to the cell arrival detection section 213, final cell detection section 214 and estimation section (CPU 215) in the evaluation apparatus 211 shown in FIG. 1, as well as those for executing the processes, shown in FIGS. 5 and 6.

Also, it is obvious that the same procedures can be applied to the functions in the QoS evaluation apparatus 1018, including the packet arrival detection section 1020, estimation section (CPU 1021), simulation section (CPU 1021), for packet networks shown in FIG. 13, as well as to the processes shown in FIGS. 5 and 14.

It is obvious also that the same procedures can be applied to the functions in the traffic measuring apparatus, including the raw data collection section 3 (including object condition discrimination section 42, measuring operation section 43), API conversion section 2, and application 1, shown in FIGS. 17 and 21.

Computer system, in this context, includes any operating systems (OS) and peripheral hardwares. Computer-readable recording media include portable media such as floppy disks, opto-magnetic disks, ROM, CD-ROM, as well as fixed devices such as hard disks housed in computer systems. Computer readable memory includes temporary storage media such as volatile memories.

Application programs may perform a part of the described functions, or may be operated in conjunction with pre-recorded programs stored in computer systems.

The preferred embodiments of the present invention have been explained with reference to the drawings, but the practical configurations are not limited to the embodied examples, and includes other possible designs operable within the principles of any of the API logic activities illustrated.

What is claimed is:

1. A quality of service evaluation apparatus comprising:
   an arrival detection section for accepting a packet duplicated and branched from packets passing through an attention point in a switching system, and assigning a timestamp of arrival time to a specific processing unit included in said packet;
   an estimating section for estimating arrival times of said processing units included in said packet at said attention point on a basis of said timestamp for said specific processing unit given by said arrival detection section; and
   a simulation section for simulating arrival time of said packet at said attention point actions of said attention point according to a simulation logic in which arrival time to correspond to said estimated arrival time at said attention point obtained by said estimating section was pre-set.

2. An apparatus according to claim 1, wherein said switching system is an ATM switching system, and said attention point is an output-line buffer in said ATM switching system.

3. An apparatus according to claim 1, wherein said processing unit is a cell and said specific processing unit is a first cell in an object packet.

4. An apparatus according to claim 2, wherein said processing unit is a cell, and said specific processing unit is an individual cell in an object packet.

5. An apparatus according to claim 3, wherein said estimating section includes a processing section for estimating an arrival time of an (i)th. cell in said packet according to a relation:
   [a timestamp of said first cell+(i−1)×(cell length/input-line speed)].

6. An apparatus according to claim 3, wherein said estimating section includes a processing section which calculates an estimated arrival time of an (i)th. cell including in said packet from a relation:
   [an estimated arrival time of the first: cell+(i−1)×(cell length/input-line speed)],
   where said estimated arrival time of the first cell is given by a sum of a base time and an estimated value of a time interval required for cells output between a reference time and a timestamp of the first cell to arrive at said attention point; wherein
   when cells are output from a switching system without creating an idle interval between the first cell of a preceding packet and the first cell of said object packet, then said base time is equal to an estimated arrival time of the first cell of the preceding packet, and said reference time is equal to a timestamp of the first cell of the preceding packet; and when there is an idle interval between the first cell of a preceding packet and the first cell of said object packet, then said base time is equal to a reference time so as to indicate a time when a most recent idle interval becomes non-idle.

7. An apparatus according to claim 3, wherein said estimating section is provided with a table that records estimated cell arrival rates at each instant of time, and is provided with a computing section to read out an estimated value "a" corresponding to a time indicated by a timestamp of a packet, and if "a"≧1, an estimated arrival time t(1) for the first cell of an object packet is calculated from a relation: [an estimated arrival time t'(1) of the first cell of a preceding packet]+[(the object packet timestamp t)−(the preceding packet timestamp t')]/(estimated cell arrival rate "a"); and if "a"<1, an estimated arrival time t(1) for the first cell of an object packet is calculated from a relation:

(an arrival time of the of the first cell of the object packet)+(a waiting time of the first cell of the object packet)=(transmitting time of the first cell of the object packet)=(a timestamp t of the object packet).

8. An apparatus according to claim 1, wherein said switch system is a router and said attention point is a network interface section connected to output-line in the router.

9. An apparatus according to claim 8, wherein said processing unit is a packet, and said estimating section includes a processing section to calculate an estimated arrival time for an (i+1)th. packet so that:

when an (i)th. completion time of packet transmission is followed continually with an (i+1)th. starting time of packet transmission, a relation is used such that: [(i)th. packet estimated arrival time+(i+1)th. starting time of packet transmission]/2, where said (i+1)th. starting time of packet transmission is obtained by subtracting a value of (packet length of (i+1)th. packet)/(output-line speed) from the timestamp of (i+1)th. packet; and when an (i)th. completion time of packet transmission is not followed continually with an (i+1)th. starting time of packet transmission, a relation is used such that: (i+1)th. packet estimated arrival time=an (i+1)th. starting time of packet transmission, where said (i+1)th. starting time of packet transmission is obtained by subtracting a value of (packet length of (i+1)th. packet)/ (output-line speed) from the timestamp of (i+1)th. packet.

10. A traffic measuring apparatus comprising:

a low layer processing section for performing protocol processing of lower level functional layers residing adjacently below an attention protocol layer in a network for transferring information using a specific processing unit;

an object condition discrimination section for deciding whether or not measurement conditions specified by an API, are satisfied in a data unit that has been subjected to processing in said low layer processing section; and an measuring operation section for carrying out measuring actions specified by said API for a data unit that has been judged to satisfy said measurement conditions; and an application section for computing desired contents of traffic measurement by manipulating raw data output from said measuring operation section.

11. A traffic measuring apparatus according to claim 10, wherein said traffic measuring apparatus further includes an API conversion section for converting upper level APIs that determine user-friendly parameters to a general purpose API for purposes of taking traffic measurements, wherein said parameters may include conditions for an object to be measured, measurement items and measurement methods, represented by terms such as addresses or protocol types in each protocol layer, protocol data units in each protocol layer; and said object condition discrimination section and said measuring operation section use said general purpose API in place of said API.

12. A traffic measuring apparatus according to claim 10, wherein an API used by said measuring operation section is a logic equation based on bit values and time information contained in data units.

13. A traffic measuring apparatus according to claim 11, wherein an API used by said measuring operation section is a logic equation based on bit values and time information contained in data units.

14. A traffic measuring apparatus according to claim 10, wherein said API is an upper level API for determining user-friendly measurement parameters including conditions for an object to be measured, measurement items and measurement methods, represented by terms such as addresses or protocol types in each protocol layer, protocol data units in each protocol layer.

15. A computer program product containing a computer program recorded on a computer usable medium for causing a computer to evaluate a quality of service based on a packet that propagate through an attention point of an switching system, said computer program effecting the steps of:

assigning a timestamp of arrival time to a specific processing unit included in inputted said packet;

estimating arrival times of said processing units included in the packet using said timestamp assigned to said specific processing unit; and simulating an arrival time said processing units at said attention point and actions of said attention point according to a simulation logic in which time corresponding to said estimated arrival time at said attention point was pre-set.

16. A computer program product containing a computer program recorded on a computer usable medium for causing a computer to carry out traffic measurements in a network using data units that have been processed for lower level functional layers residing immediately below an attention protocol layer for transmitting information using a specific processing unit, said computer program effecting the steps of:

deciding whether or not one of said data units satisfies object conditions specified by an API;

carrying out measurement actions on those data units that have been judged to satisfy object conditions, according to conditions specified by said API; and calculating desired contents of traffic measurement by manipulating raw data produced by measurement actions.

* * * * *